United States Patent
Tajima et al.

(10) Patent No.: US 11,901,095 B2
(45) Date of Patent: Feb. 13, 2024

(54) SYSTEM FOR ELECTROSTATIC ACCELERATOR DRIVEN NEUTRON GENERATION FOR A LIQUID-PHASE BASED TRANSMUTATION OF RADIOACTIVE TRANSURANIC WASTE

(71) Applicant: TAE TECHNOLOGIES, INC., Foothill Ranch, CA (US)

(72) Inventors: Toshiki Tajima, Foothill Ranch, CA (US); Michl W. Binderbauer, Ladera Ranch, CA (US); Ales Necas, Greensboro, NC (US)

(73) Assignee: TAE TECHNOLOGIES, INC., Foothill Ranch, CA (US)

( * ) Notice: Subject to any disclaimer, the term of this patent is extended or adjusted under 35 U.S.C. 154(b) by 0 days.

(21) Appl. No.: 17/193,973

(22) Filed: Mar. 5, 2021

(65) Prior Publication Data
US 2021/0358650 A1    Nov. 18, 2021

Related U.S. Application Data

(63) Continuation of application No. PCT/US2019/049824, filed on Sep. 5, 2019.
(Continued)

(51) Int. Cl.
| | |
|---|---|
| G21G 1/06 | (2006.01) |
| G21F 9/06 | (2006.01) |
| G21G 4/02 | (2006.01) |
| G21B 3/00 | (2006.01) |
| H05H 3/06 | (2006.01) |
| H05H 6/00 | (2006.01) |
| G21K 5/04 | (2006.01) |
| G21D 9/00 | (2006.01) |

(Continued)

(52) U.S. Cl.
CPC ............... G21G 1/06 (2013.01); G21B 3/006 (2013.01); G21F 9/06 (2013.01); G21G 4/02 (2013.01); H05H 3/06 (2013.01); H05H 6/00 (2013.01); G21D 9/00 (2013.01); G21K 5/04 (2013.01); H05H 5/02 (2013.01); H05H 5/04 (2013.01)

(58) Field of Classification Search
CPC . G21G 1/06; G21G 4/02; G21B 3/006; G21F 9/06; H05H 3/06; H05H 6/00
See application file for complete search history.

(56) References Cited

U.S. PATENT DOCUMENTS

| | | | |
|---|---|---|---|
| 5,541,947 | A | 7/1996 | Mourou et al. |
| 6,867,419 | B2 | 3/2005 | Tajima |

(Continued)

FOREIGN PATENT DOCUMENTS

| | | |
|---|---|---|
| WO | WO 03/025951 A1 | 3/2003 |
| WO | WO 2013/119299 A2 | 8/2013 |
| WO | WO 2015/160407 A2 | 10/2015 |

OTHER PUBLICATIONS

EP 19857901.3 Extended Search Report, dated May 3, 2022.
(Continued)

*Primary Examiner* — Jack W Keith
*Assistant Examiner* — Daniel Wasil
(74) *Attorney, Agent, or Firm* — ONE LLP

(57) ABSTRACT

Systems and methods that facilitate the transmutation of long-lived radioactive transuranic waste into short-live radioactive nuclides or stable nuclides using an electrostatic accelerator particle beam to generate neutrons.

19 Claims, 14 Drawing Sheets

Related U.S. Application Data

(60) Provisional application No. 62/876,979, filed on Jul. 22, 2019, provisional application No. 62/727,418, filed on Sep. 5, 2018.

(51) Int. Cl.
  *H05H 5/04* (2006.01)
  *H05H 5/02* (2006.01)

(56) References Cited

U.S. PATENT DOCUMENTS

| | | | |
|---|---|---|---|
| 2005/0013397 A1* | 1/2005 | Csom | G21C 1/30 588/1 |
| 2008/0113423 A1* | 5/2008 | Hindley | G21F 9/00 435/262.5 |
| 2009/0147906 A1 | 6/2009 | Cooper et al. | |
| 2011/0260043 A1 | 10/2011 | Dent | |
| 2012/0164063 A1 | 6/2012 | Miley et al. | |
| 2013/0142296 A1 | 6/2013 | Piefer et al. | |
| 2015/0078504 A1 | 3/2015 | Wooley | |
| 2015/0098544 A1 | 4/2015 | Blanovsky | |

OTHER PUBLICATIONS

WO PCT/US2019/049824 ISR and Written Opinion, dated Jan. 2, 2020.
WO PCT/US2019/049820 ISR and Written Opinion, dated Jan. 9, 2020.
Backus, S., et al., "0.2-TW laser system at 1 KHz", Optics Letters, 1997, vol. 22, No. 16, pp. 1256-1258.
Budriunas, R., et al., "53 W average power CEP-stabilized OPCPA, system delivering 5.5 TW few cycle pulses at 1 kHz repetition rate", Optics Express, 2017, vol. 25, No. 5, pp. 5797-5806.
Dubietis, A., et al., "Powerful femtosecond pulse generation by chirped and stretched pulse parametric amplification in BBO crystal", Optics Communications, 1992, vol. 88, pp. 437-440.
Esirkepov, T., et al., "Laser Ion-Acceleration Scaling Laws Seen in Multi-Parametric PIC Simulations", Physical Review Letters, 2006. vol. 96, No. 10, pp. 1-4.
Giesen, A., et al., "Fifteen Years of Eork on Thin-Disk Lasers: Results and Scaling Laws", IEEE Journal of Selected Topics in Quantum Electronics, 2007, vol. 13, No. 3, pp. 598-609.
Gohar, Y., "Fusion Option to Dispose of Spent Nuclear Fuel and Transuranic Elements", 2000, retrieved from https://inis.iaea.org/collection/NCLCollectionStore/_Public/31/042/31042107.pdf, pp. 1-33.
Gulik, V., et al., "Cost optimization of ADS design: Comparative study of externally driven heterogeneous and homogeneous two-zone subcritical reactor systems", Nuclear Engineering and Design, 2014, vol. 270, pp. 133-142.
Kishimoto, Y., et al., "Strong Coupling between Clusters and Radiation", High-Field Science, 2000, pp. 83-96.
Kishimoto, Y., et al., "High energy ions and nuclear fusion in laser-cluster interaction", Physics of Plasmas, 2002, vol. 9, No. 2, pp. 589-601.
Mako, F. M., et al., "Collective Ion Acceleration by a Reflexing Electron Beam: Model and Scaling", The Physics of Fluids, 1984, vol. 27, No. 7, pp. 1815-1820.
Mourou, G., et al., "The future is fibre accelerators", Nature Photonics, 2013, vol. 7, pp. 258-261.
Mourou, G., et al., "Single cycle thin film compressor opening the door to Zeptosecond-Exawatt physics", The European Physical Journal Special Topics, 2014, vol. 223, No. 6, pp. 1181-1188.
"Nuclear Waste Disposal—Issue Summary", retrieved from https://www.gao.gov/key_issues/disposal_of_highlevel_nuclear_waste/issue_summary, pp. 1-5.
Sheu, R. J., et al., "Depletion analysis on long-term operation of the conceptual Molten Salt Actinide Recycler & Transmuter (MOSART) by using a special sequence based on SCALE6/TRITON", Annals of Nuclear Energy, 2013, vol. 53, pp. 1-8.
Stacey, W. M., "Solving the Spent Nuclear Fuel Problem by Fissioning Transuranics in Subcritical Advanced Burner Reactors Driven by Tokamak Fusion Neutron Sources", Nuclear Technology, 2017, vol. 200, No. 1, pp. 15-26.
Steinke, S., et al., "Efficient ion acceleration by collective laser-drive electron dynamics with ultra-thin foil targets", Laser and Particle Beams, 2010, vol. 28, No. 1, pp. 215-221.
Strickland, d., et al., "Compression of Amplified Chirped Optical Pulses", Optics Communications, 1985, vol. 56, No. 3, pp. 219-221.
Tajima, T., et al., "Laser Acceleration of Ions for Radiation Therapy", Reviews of Accelerator Science and Technology, 2009, vol. 2, No. 1, pp. 201-228.
Yan, X.Q., et al., "Theory of laser ion acceleration from a foil target of nanometer thickness", Applied Physics B, 2010, vol. 98, No. 4, pp. 711-721.
Zhou, M. L., et al., "Proton acceleration by single-cycle laser pulses offers a novel monoenergetic and stable operating regime", Physics of Plasmas, 2016, vol. 23, No. 4, pp. 043112-1-043112-6.
JP 2021-524144 Office Action, dated May 3, 2022.

* cited by examiner

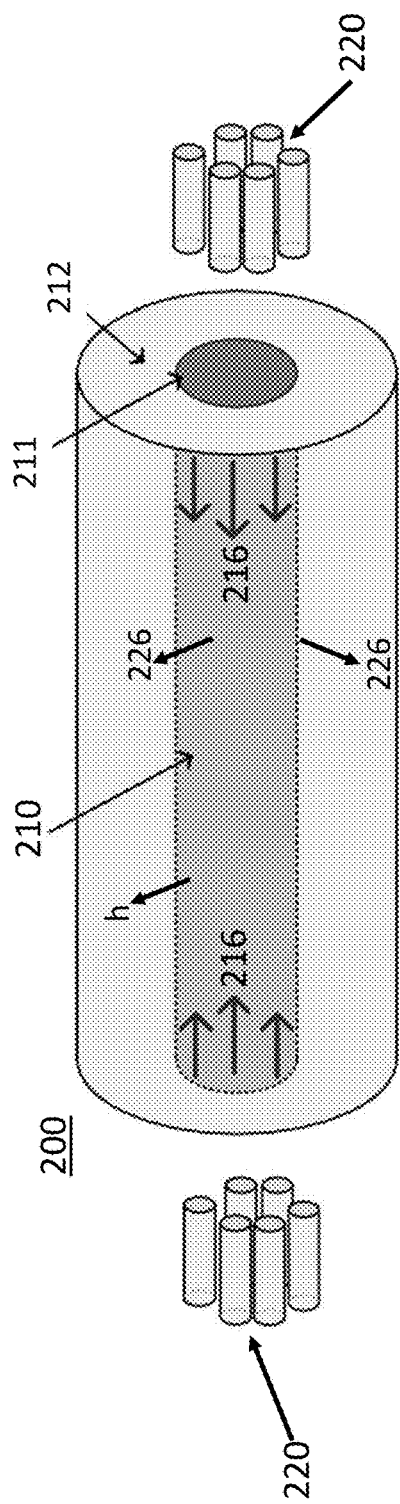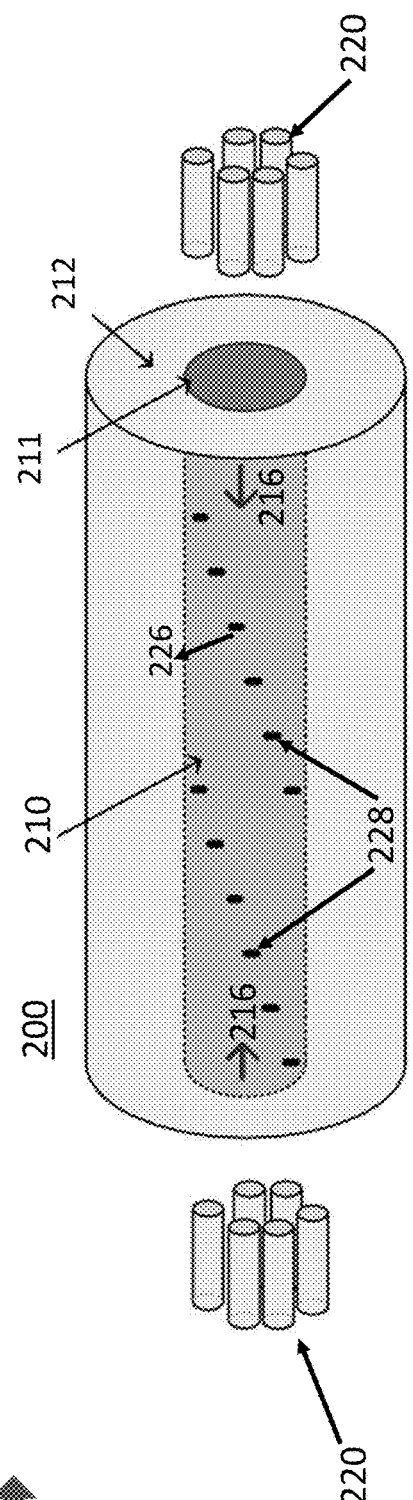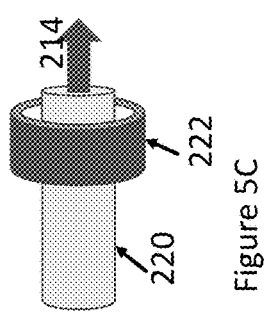

SYSTEM FOR ELECTROSTATIC ACCELERATOR DRIVEN NEUTRON GENERATION FOR A LIQUID-PHASE BASED TRANSMUTATION OF RADIOACTIVE TRANSURANIC WASTE

CROSS-REFERENCE TO RELATED APPLICATIONS

The subject application is a continuation of PCT Patent Application No. PCT/US19/49824, filed Sep. 5, 2019, which claims priority to U.S. Provisional Patent Application No. 62/876,979, filed on Jul. 22, 2019, and U.S. Provisional Patent Application No. 62/727,418, filed on Sep. 5, 2018, all of which are incorporated by reference herein in their entireties for all purposes.

FIELD

The subject matter described herein relates generally to systems and methods that facilitate the generation of a large rate of energetic neutrons (or other particles) by an electrostatic accelerator driven beam for purposes of transmutation of long-lived radioactive waste into short-live radioactive nuclides or stable nuclides, and, more particularly, to a subcritical liquid phase-based transmutation of radioactive waste.

BACKGROUND

Nuclear fission reactors generate a constant stream of radioactive nuclides of the spent fuel: in United States alone 90,000 metric tons requires disposal [Ref. 1], and by 2020 the worldwide spent nuclear waste inventory will reach 200,000 metric tons with 8000 tons added each year. Nuclear power accounts for 77% of electricity in France, making the need for transmutation particularly acute. Currently, there are no proper and adequate means available to treat these isotopic radioactive materials other than deep earth burial. The development of such means to treat isotopic radioactive materials requires the completion of two tasks: First, developing easy, robust, safe, and inexpensive methods to separate highly radioactive isotopes from the rest of the materials in order to avoid activating the non-radioactive material through transmutation; and, second, developing a safe, inexpensive, energy non-exhaustive, versatile transmutation method.

Current approaches to transmutation of radioactive nuclei include drivers that maintain the subcritical fission reactor by an external means: one is based on an accelerator driven system (ADS) [Ref. 2], and the other is based on tokamak driven systems [Ref. 3]. The ADS system relies on a highly energetic (~1 GeV) proton beam impinging on a substrate (e.g. Pb, W) and ejecting neutrons (30+ neutrons per proton). These neutrons then maintain fission in a subcritical reactor. The tokamak-based system generates neutron from the deuterium-tritium reactions and uses these neutrons to drive the subcritical reactor, also called the fission-fusion hybrid.

Other approaches to transmuting nuclear waste based on a supercritical operation also exist—MOSART [Ref. 4], as well as various approaches using the Gen-IV reactors.

For these and other reasons, needs exist for improved systems, devices, and methods that facilitates generation of a large rate of energetic neutrons by electrostatic accelerator-driven beam for purposes of subcritical liquid phase-based transmutation of radioactive waste.

SUMMARY

The various embodiments provided herein are generally directed to systems and methods that facilitate transmutation of long-lived high-level radioactive waste by means of fusion generated neutrons into short-lived radioactive nuclides or stable nuclides. The various embodiments provided herein, like conventional methods, utilize deuterium-tritium or deuterium-deuterium fusion to generate neutrons, but do so in a liquid phase (mixture of FLiBe and minor actinides solution) approach that uses electrostatic accelerator particle beams to generate neutrons. In such an approach, the neutrons are advantageously and directly used for transmutation, thus eliminating the need for a fission reactor. The electrostatic accelerator-driven neutron source advantageously generates a high rate of neutrons for stable startup and further control of the transmutator.

In example embodiments, a transmutation process employs a subcritical method of operation utilizing a compact device to transmute radioactive isotopes (mainly those of minor actinides (MA)) carried out in a tank containing a liquefied solution of a mix of the spent fuel waste components (such as the fission products (FP) and MA) dissolved within molten salt solution of LiF—BeF2 (FLiBe). [Ref. 5] Transmutation of the MA is performed with energetic neutrons originating from a fusion reaction driven by an electrostatic accelerator. Monitoring and control in real-time of the FLiBe, MA and FP content within the transmutator is performed with active laser spectroscopy or a laser driven gamma source.

In example embodiments, a central tank comprising a neutron source is surrounded by a plurality of concentric tanks. The plurality of concentric tanks includes first and second concentric tanks comprising a liquid phase mixture of actinides, a third concentric tank comprising fission products, and a fourth concentric tank comprising a neutron reflecting boundary.

In example embodiments, the neutron source includes an electrostatic accelerator and a neutron generating target. The electrostatic accelerator creates a deuteron beam in the energy range between 150 keV and 200 keV. The accelerated deuteron beam interacts with a gas or solid tritium or deuterium target in a pressurized tank to generate neutrons. The neutrons are emitted from the pressurized tank and interact with and incinerate minor actinides in the surrounding tanks.

Advantages of the example embodiments of electrostatic accelerator generated neutrons to startup and control a transmutator include:
  a) Small size of the electrostatic accelerator driven ion beams and their targets
  b) Known and robust technology
  c) Fine spatial and temporal neutron control
  d) High current
  e) Gas or solid tritium or deuterium target
  f) Stable steady-state operation In the various embodiments provided herein, the transmutation of low level radioactive waste ("LLRW") occurs in a liquid state whereas the LLRW is dissolved in a molten salt of lithium fluoride beryllium fluoride (FLiBe).

In the various embodiments provided herein, the transmutation machine operates in a subcritical mode whereas the neutron source is required at all times to drive the transmutation.

In certain example embodiments, the laser monitoring via laser-spectroscopy is carried out by a CAN laser [Ref. 12].

In addition, a laser-driven gamma source (commonly called laser Compton gamma-rays) is provided to track the content and behavior of isotopes of MA and FP in the tanks in real-time.

A further embodiment is directed to a 2-tank strategy to reduce the overall neutron cost whereas one tank is critical, and the other tank is subcritical. The two tanks comprise two interconnected sets of tanks. The first tank or set of tanks preferably contains a mixture of Pu and minor actinides (MA) including neptunium, americium and curium (Np, Am, Cm), while the second tank or set of tanks contains a mixture of only minor actinides (MA). Since the first tank or set of tanks is critical ($k_{eff}=1$), an external source of neutrons is unnecessary. Furthermore, the first tank or set of tanks is fueled using the spent nuclear fuel (Pu and MA) after chemical removal of fission products. The first tank or set of tanks utilizes fast neutrons (fusion neutrons in addition to unmoderated fission neutrons with energy >1 MeV) to transmute the minor actinides (MA) and plutonium (Pu), while the concentration of curium (Cm) is increased. Alternatively, a minor amount of neutrons can be injected into the first tank or set of tanks to kick start the incineration of Pu.

In a further embodiment the walls of the first and second tank or set of tanks are made of carbon based materials, such as, e.g., diamond. To protect walls from chemical erosion and corrosion, the salt adjacent to the wall (facing the molten salt) is allowed to solidify preventing direct contact of the molten salt with the walls.

In a further embodiment, the transmutator embodiments described above can be applied to the methods and processes of carbon dioxide reduction such as its use as a coolant and its generation of a synthetic fuel to become overall carbon-negative is suggested. In the following example embodiment, the synthetic fuel ($CH_4$-methane) may be generated via $CO_2 + 4H_2 \rightarrow CH_4 + 2H_2O$ reaction (Sabatier reaction) requiring 200-400° C. and the presence of a catalyst, e.g., Ni, Cu, Ru. The $CO_2$ may be extracted from the atmosphere, the ocean, or by direct capturing of $CO_2$ at the source of emission such as automobiles, houses, chimneys and smokestacks. The molten salt transmutator operating temperature range is 250-1200° C. and, thus, is ideally situated to supply continuously the necessary temperature required to drive the Sabatier reaction to produce methane, and provide an effective pathway to stabilize and reduce the $CO_2$ concentration in the atmosphere and the ocean.

Other systems, devices, methods, features and advantages of the subject matter described herein will be or will become apparent to one with skill in the art upon examination of the following figures and detailed description. It is intended that all such additional systems, methods, features and advantages be included within this description, be within the scope of the subject matter described herein, and be protected by the accompanying claims. In no way should the features of the example embodiments be construed as limiting the appended claims, absent express recitation of those features in the claims.

BRIEF DESCRIPTION OF FIGURES

The details of the example embodiments, including structure and operation, may be gleaned in part by study of the accompanying figures, in which like reference numerals refer to like parts. The components in the figures are not necessarily to scale, emphasis instead being placed upon illustrating the principles of the disclosure. Moreover, all illustrations are intended to convey concepts, where relative sizes, shapes and other detailed attributes may be illustrated schematically rather than literally or precisely.

FIG. 5A illustrates a perspective view of a neutron source tank and a single adjacent tank whereas a plurality of deuteron beams are injected into a tank containing pressurized tritium gas from beam sources positioned outside of the neutron source tank.

FIG. 5B illustrates a perspective view of a neutron source tank and a single adjacent tank whereas a plurality deuteron beams are injected onto solid neutron generating targets from beam sources positioned outside of the neutron source tank that are focused onto the solid targets.

FIG. 5C illustrates a perspective view of a single deuteron beam assembly with beam focusing magnets.

It should be noted that elements of similar structures or functions are generally represented by like reference numerals for illustrative purpose throughout the figures. It should also be noted that the figures are only intended to facilitate the description of the preferred embodiments.

DETAILED DESCRIPTION

Each of the additional features and teachings disclosed below can be utilized separately or in conjunction with other features and teachings to provide systems and methods that facilitate the transmutation of long-lived radioactive waste into short-live radioactive nuclides or stable nuclides utilizing an electrostatic accelerator particle beam approach to the generation of neutrons.

Moreover, the various features of the representative examples and the dependent claims may be combined in ways that are not specifically and explicitly enumerated in order to provide additional useful embodiments of the present teachings. In addition, it is expressly noted that all features disclosed in the description and/or the claims are intended to be disclosed separately and independently from each other for the purpose of original disclosure, as well as for the purpose of restricting the claimed subject matter independent of the compositions of the features in the embodiments and/or the claims. It is also expressly noted that all value ranges or indications of groups of entities disclose every possible intermediate value or intermediate entity for the purpose of original disclosure, as well as for the purpose of restricting the claimed subject matter.

In example embodiments provided herein, the neutrons are generated by electrostatic accelerator driven fusion to transmute long lived radioactive nuclei into short-lived or non-radioactive nuclides.

In example embodiments, a transmutation process employs a subcritical method of operation utilizing a compact device to transmute radioactive isotopes (mainly those of minor actinides (MA)) carried out in a tank containing a liquefied solution of a mix of the spent fuel waste components (such as the fission products (FP) and MA) dissolved within molten salt solution of LiF—BeF2 (FLiBe). Such process is described in U.S. Provisional Patent Application No. 62/544,666 [Ref. 5], which is incorporated herein by reference. Transmutation of the MA is performed with energetic neutrons originating from a fusion reaction driven by an electrostatic accelerator. Monitoring and control in real-time of the FLiBe, MA and FP content within the transmutator is performed with active laser spectroscopy or a laser driven gamma source.

Figure 1B:
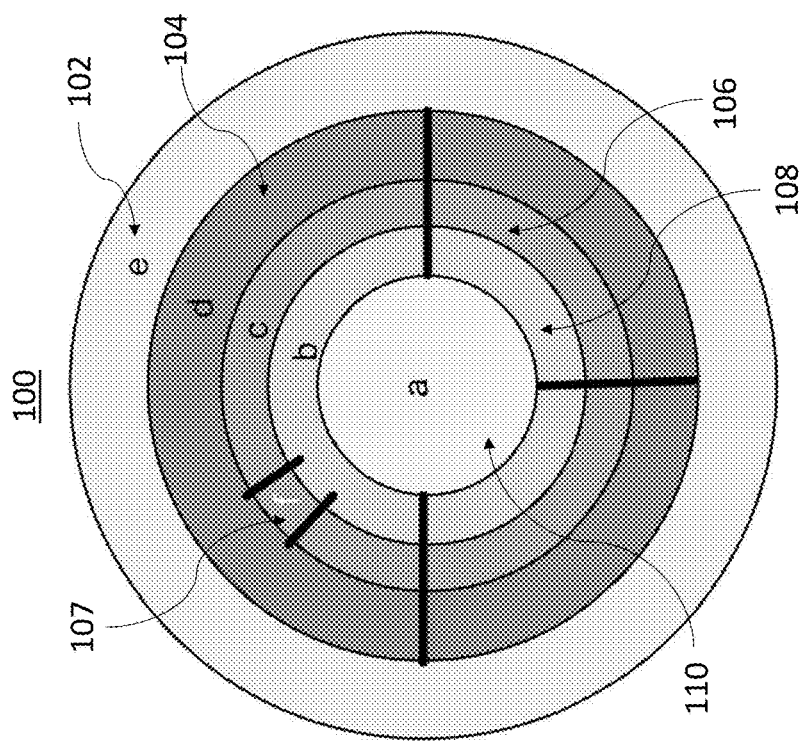
FIG. 1B illustrates a cross sectional view of an azimuthally segmented transmutator vessel.
Figure 1A:
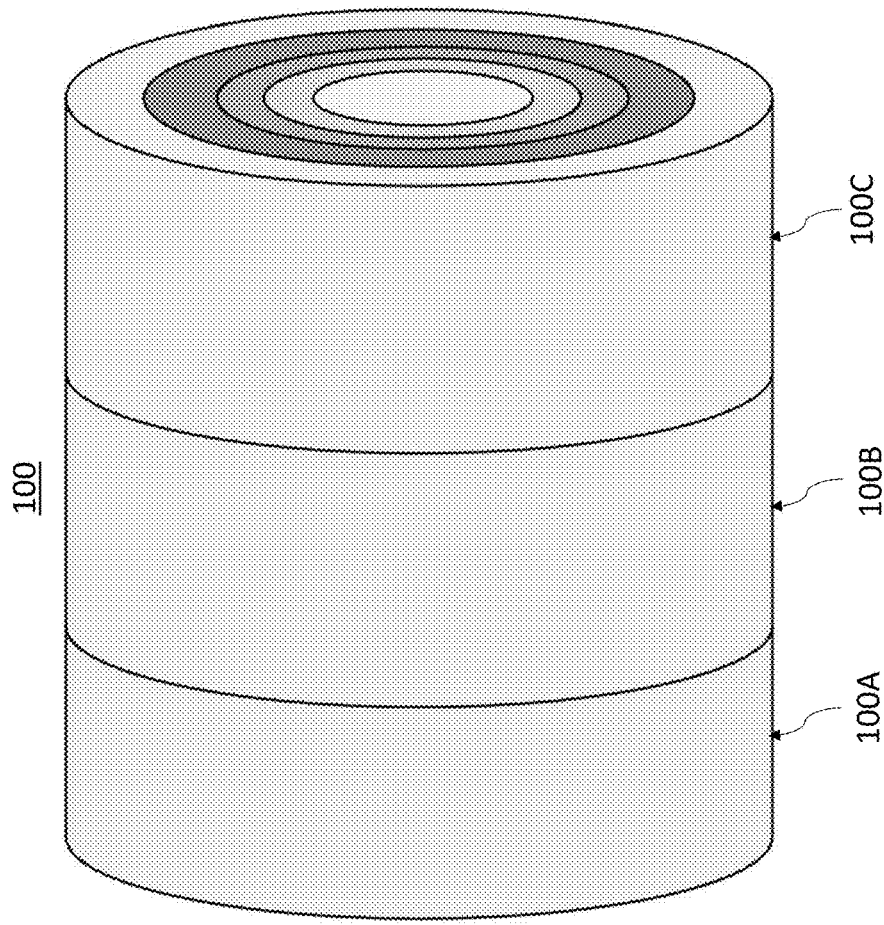
FIG. 1A illustrates a perspective view of an axially segmented transmutator vessel.

Turning to the figures, FIGS. 1A and 1B show a segmented transmutator vessel 100. FIG. 1A shows a representative case of axial radial segmentation of the vessel 100 into three (3) vessel sections 100A, 100B and 100C. FIG. 1B shows a representative cross-section of the radial and azimuthal segmentation of the vessel 100. The transmutator vessel 100 in the present embodiment is radially segmented into concentric cylindrical chambers or tanks 102, 104, 106, 108 and 110. An azimuthally segmented chamber 107 shows a representative chamber used for either diagnostics or for additional source of neutrons. By segmenting the vessel 100, control and localization of various parameters can be increased more easily and/or more precisely, as well as increase the overall transmutator safety by data feedback from various segments via an artificial neural network to control valves to adjust minor actinide concentration. Such precise control optimizes the most minor actinide burned while remaining safe.

The central tank or chamber 110 is a pressurized gas chamber composed of deuterium or tritium gas and functions as the neutron source to ignite the self-sustaining chain reaction in the first and second concentric tanks 108 and 106. The first and second tanks 106 and 108 contain a mixture of FLiBe molten salt and minor actinides. The third concentric tank 104 contains fission products that are transmuted into stable or short-lived nuclides. The fourth concentric tank 102 is a graphite reflector.

In example embodiments, a mixture of lithium fluoride (LiF) and beryllium fluoride (BeF2) is used as a coolant, a neutron moderator and a solvent of the transuranic elements. The salt mixture is composed of 2:1 ratio of LiF to BeF2, hence the stoichiometric compound is given by Li2BeF4. In the literature, this compound is called FLiBe. The operation of the transmutator in this liquid state is akin to the molten salt reactor (MSR). FLiBe salt has a high heat transfer with capability of carrying the same amount of heat (J/K) as water. The heat capacity of FLiBe is 2350 J/(kg-K) while water is 4219 J/(kg-K). Furthermore, the density of FLiBe density is about 2 times that of water. FLiBe molten-salt remains liquid up to 1430° C. without pressurization, providing good safety. For example, a pressure water reactor has an operating temperature of 315° C. while being held at 150 atmospheres. The FliBe salt solidifies at 459° C., providing good safety in case of accident with loss of coolant.

Fission of TRU elements produces FP (e.g. Tc-99, 1-129, Zr-93 are very long lived and Sr-90, Cs-137 generate almost all radioactivity first 1000 years). A transmutation [(n,2n), (n,3n) etc.] of FP using fast (>1 MeV) neutron into stable nuclei is also achieved.

The outer most tank 102 may be filled with water to control criticality, reactivity and other activities. Further adjustment of criticality may be achieved by replacing the volume of the outer most tank 102 with a neutron reflecting boundary such as, e.g., a graphite neutron reflector.

Further adjustment of criticality may be achieved by retaining the outer most tank 102 with a volume containing water and surrounding it along the outer radius with a neutron reflecting boundary.

Real-time monitoring of the FLiBe and TRU mixture as well as fission products (FP) in each tank feedbacks the density of TRU and FPs (including real-time injection control of TRU). By adjusting the density of TRU/FLiBe/FP, criticality may be adjusted. Furthermore, with knowledge of the composition of the mixture in a given tank, separation of different FP using solvent extraction techniques is performed.

Between the first concentric tank 108 and the second concentric tank 106, a reflector (e.g. beryllium) can be inserted to reflect neutrons back into the first tank 108, and thus increase neutron multiplication. If real-time monitoring determines a certain criticality or other conditions (i.e., temperature, concentration) are satisfied, the pre-programmed feedback control intervenes to retract the reflectors either fully or partially.

Real-time monitoring of the criticality and other physical parameters (i.e., temperature, concentration, and FLiBe chemistry) is performed in all tanks 108, 106 and 104, and in any additional tank. Data is then feedback into control circuitry which is connected to valves, pumps etc. to maintain preset parameters.

The neutron generating machine inside the cylindrical tank 110 may be positioned on a rail system to easily slide in and out. In one scenario, the machine remains inside the tank 110. In a second scenario, once the real-time monitoring system establishes that a critical value is reached inside the tanks 108 and 106 with FLiBe/TRU solution, the neutron generator may be withdrawn and reused in a different assembly of tanks 108 and 106.

Figure 2:
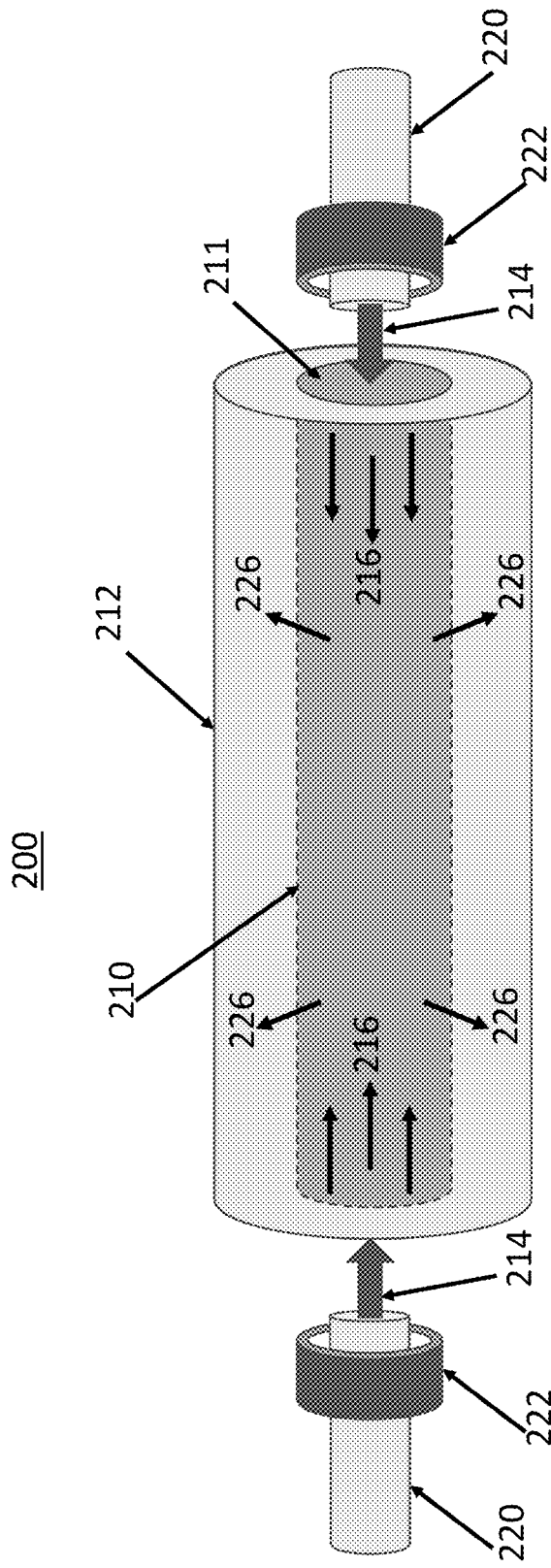
FIG. 2 illustrates a perspective view of a neutron source tank and a single adjacent tank whereas a deuteron beam is injected into a pressurized tank filled with tritium gas.

FIG. 2 shows a partial view of a single assembly of a transmutator 200 having a tank 212 filled with a mixture of minor actinides and FLiBe and a neutron source tank 210 positioned therein. Additional tanks, as shown in FIGS. 1A, 1B may enclose the tank 212. In this embodiment, a deuteron beam 214 is generated by the electrostatic accelerator 220 (see FIG. 6) focused by a magnet 222 to pass through an entrance port 211 to the neutron source tank 210. The energy of the deuteron beam 214 is in the range of 150-200 keV (at a current of 10 A). The deuteron beam 216 then propagates through the pressurized tank 210 filled with tritium or deuterium gas. Within the pressurized tank 210, the deuteron beam 216 interacts and fuses with tritium or deuterium producing neutrons 226. The neutrons 226 are emitted from the pressurized tank 210 and interact with and incinerate minor actinides in the concentric tank 212.

Figure 3:
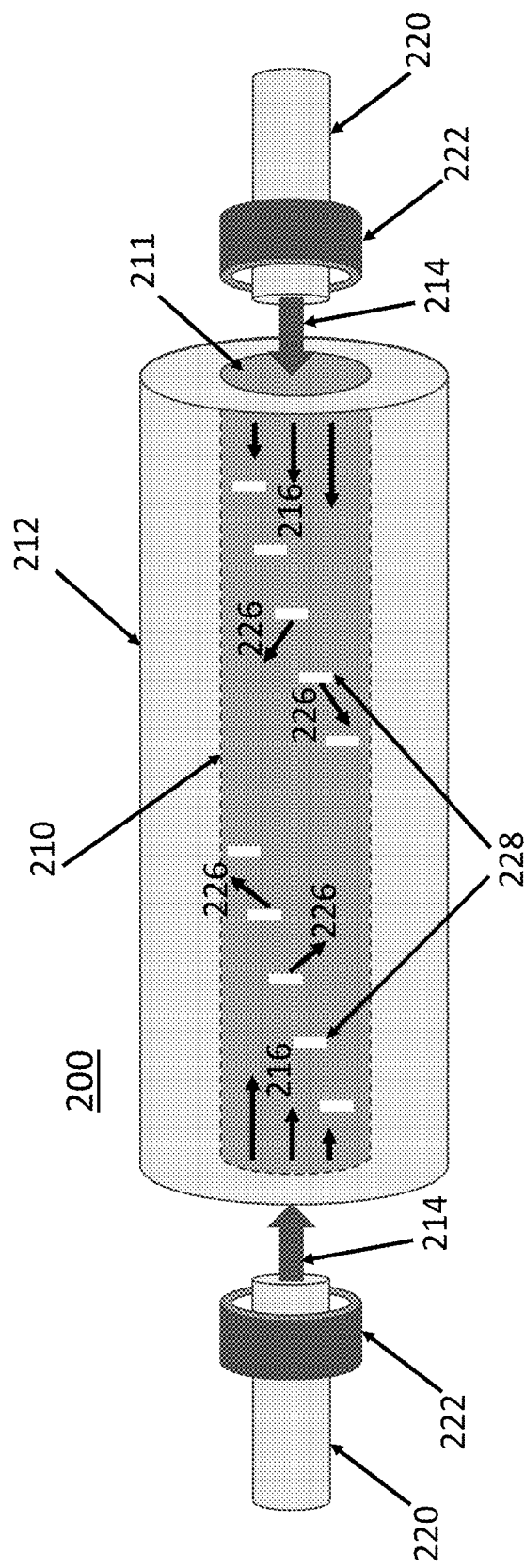
FIG. 3 illustrates a perspective view of a neutron source tank and a single adjacent tank whereas a deuteron beam is injected onto a solid neutron generating targets in addition to a pressurized tank filled with tritium gas.

FIG. 3 shows an alternative embodiment of neutron generation with positive deuteron beams. The deuteron beam 214 is created and the deuteron beam 216 propagates within the neutron source tank 210 as described above with regards to the embodiment shown in FIG. 2. As depicted in the FIG. 3, the deuteron beam 216 propagates within the neutron source tank 210 onto a solid target 228 composed of either titanium-tritium or titanium-deuterium. The deuteron beam 216 interacts with either the tritium or deuterium of the solid target 228 to generate fusion neutrons 226. The neutrons 226 are emitted from the pressurized tank 210 and interact with and incinerate minor actinides in the concentric tank 212.

In an alternative embodiment, the solid target 228 depicted in FIG. 3 is composed of titanium. The injected deuteron beam 216 imbeds within the titanium lattice, and any subsequent deuteron beams 216 then interact with the already imbedded deuterons to create fusion neutrons 226.

Figure 4A:
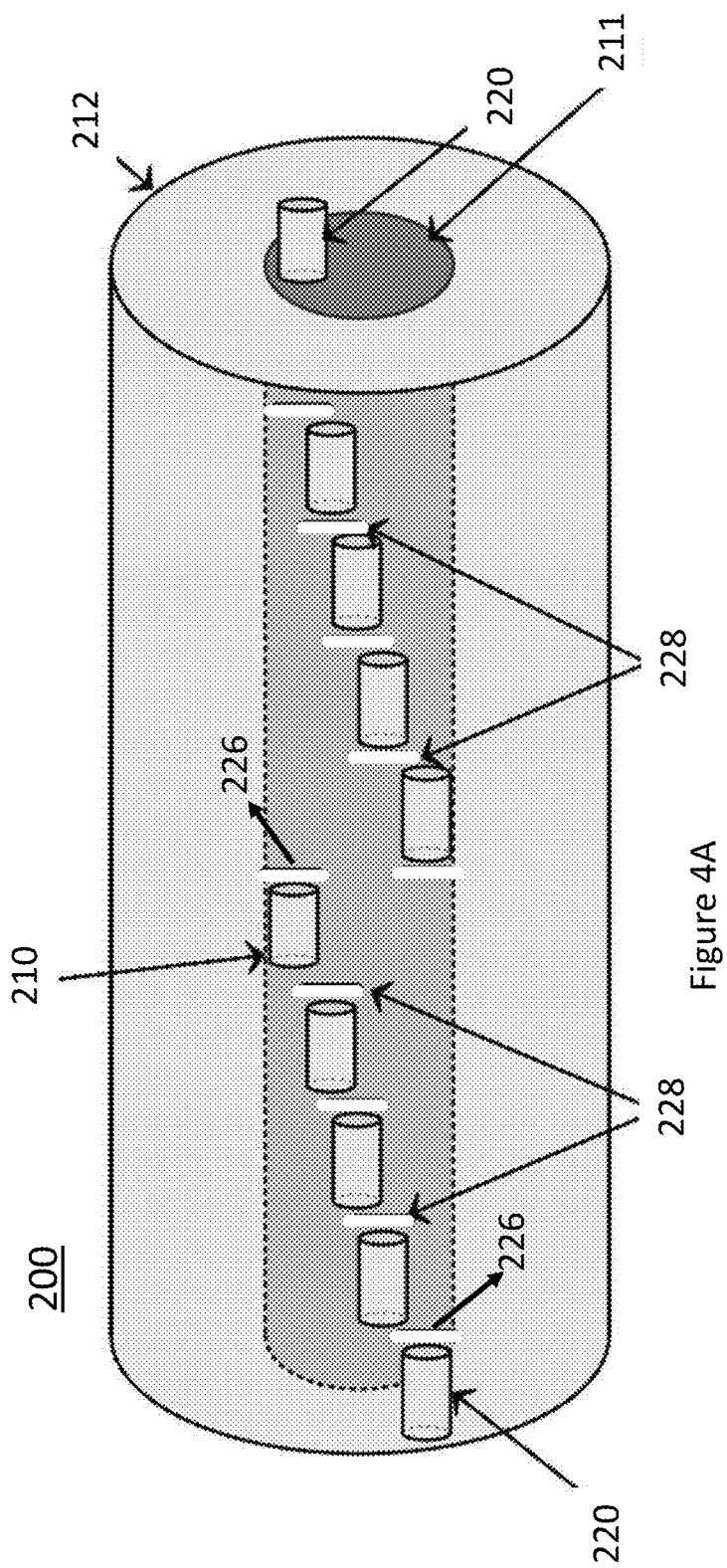
FIG. 4A illustrates a perspective view of a neutron source tank and a single adjacent tank whereas deuteron beams are injected onto solid neutron generating targets, and whereas the beam sources are positioned within the neutron source tank.
Figure 4B:
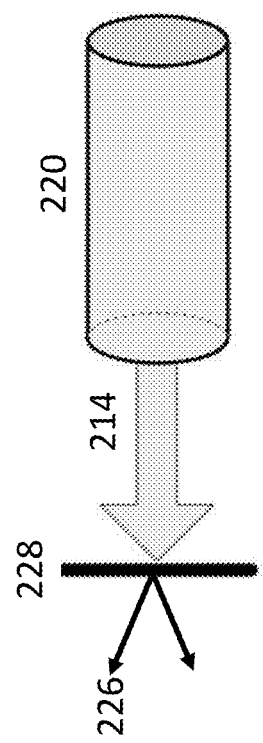
FIG. 4B illustrates a perspective view of a single deuteron beam and solid target assembly.

FIG. 4A shows a partial view of an alternative embodiment of a single assembly of a transmutator 200 having a tank 212 filled with a mixture of minor actinides and FLiBe and a neutron source tank 210 positioned therein. A plurality of deuteron beams 214 and solid targets 228 are provided with the beams 214 injected from electrostatic accelerators 220 positioned within the neutron source tank 210. A single deuteron beam generator 220, deuteron beam 214 and solid target 228 are shown in FIG. 4B. The deuteron beam 214 interacts with either the tritium or deuterium solid target 228 to generate fusion neutrons 226. The neutrons 226 are emitted from the neutron source tank 210 and interact with and incinerate minor actinides in the tank 212 surrounding the source tank 210.

In an alternative embodiment, the solid target 228 depicted in FIGS. 4A and 4B is composed of titanium. The injected deuteron beam 216 imbeds within the titanium lattice, and any subsequent deuteron beams 216 then interact with the already imbedded deuterons to create fusion neutrons 226.

FIG. 5A shows a partial view of an alternative embodiment of a single assembly of a transmutator 200 having a tank 212 filled with a mixture of minor actinides and FLiBe and a neutron source tank 210 positioned therein. A plurality of deuteron beam assemblies 220 are provided with the beams 216 injected external to the neutron source tank 210 filled with pressurized tritium or deuterium gas. The deuteron beams 216 are injected into the tank 210 through the entrance port 211 and consequently propagate through the tank 210 where the deuteron beams 216 interact and fuse with the tritium or deuterium gas to generate neutrons 226.

FIG. 5C shows a single beam assembly 220 whereas beam assembly 220 and focusing magnet 222 are shown. The focused beam 214 is subsequently injected into the neutron source tank 210 passing through the entrance port 211.

FIG. 5B shows an alternative embodiment. The plurality of beams 216 are injected onto solid targets 228 generating fusion neutrons 226. The solid targets 228 are composed of either titanium-tritium or titanium-deuterium. The deuteron beam 216 interacts with either tritium or deuterium of the solid target 228 to generate the fusion neutrons 226. The neutrons 226 are emitted from the pressurized tank 210 to interact with and incinerate minor actinides in the tank 212 surrounding the pressurized tank 210.

In an alternative embodiment, the solid target 228 depicted in FIG. 5B is composed of titanium. The injected deuteron beam 216 imbeds within the titanium lattice, and any subsequent deuteron beams 216 then interact with the already imbedded deuterons to create fusion neutrons 226.

Figure 6:
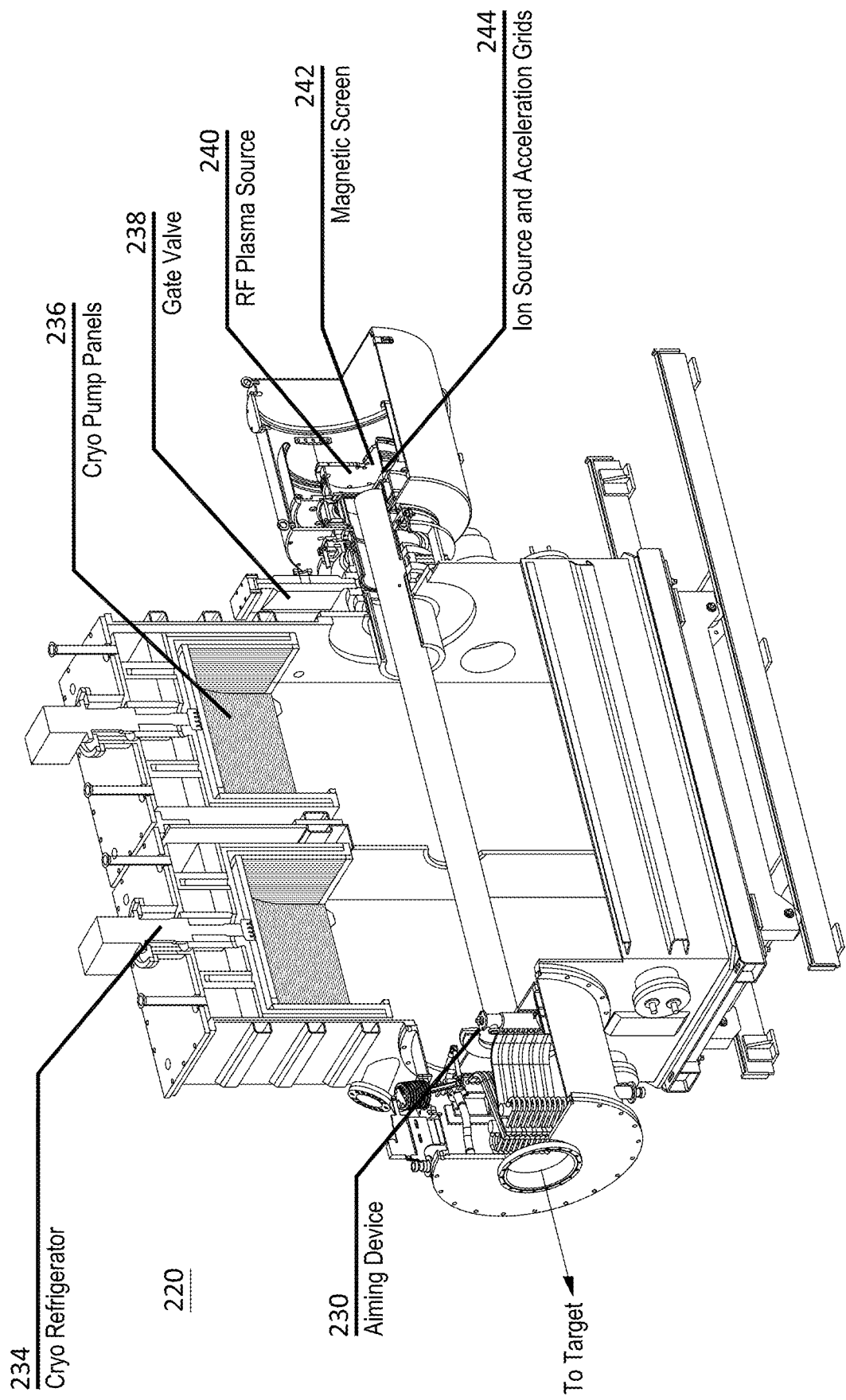
FIG. 6 illustrates a perspective view of an electrostatic accelerator.

Turning to FIG. 6, an example embodiment of an electrostatic accelerator beam system is shown. As depicted, a beam system 220 is based on positive ion multi-aperture extraction sources and utilizes geometric focusing, inertial cooling of the ion extraction grids and differential pumping. The beam system 220 includes an RF plasma source 240 at an input end (this can be substituted with an arc source or the like) with a magnetic screen 242 covering the end. An ion optical source and acceleration grids 244 are coupled to the plasma source 240 and a gate valve 238 is positioned between the ion optical source and acceleration grids 244 and an aiming device 230 at the exit end. A cooling system comprises two cryo-refrigerators 234, two cryopanels 236 and a LN2 shroud. This flexible design allows for operation over a broad range of parameters.

Figure 7:
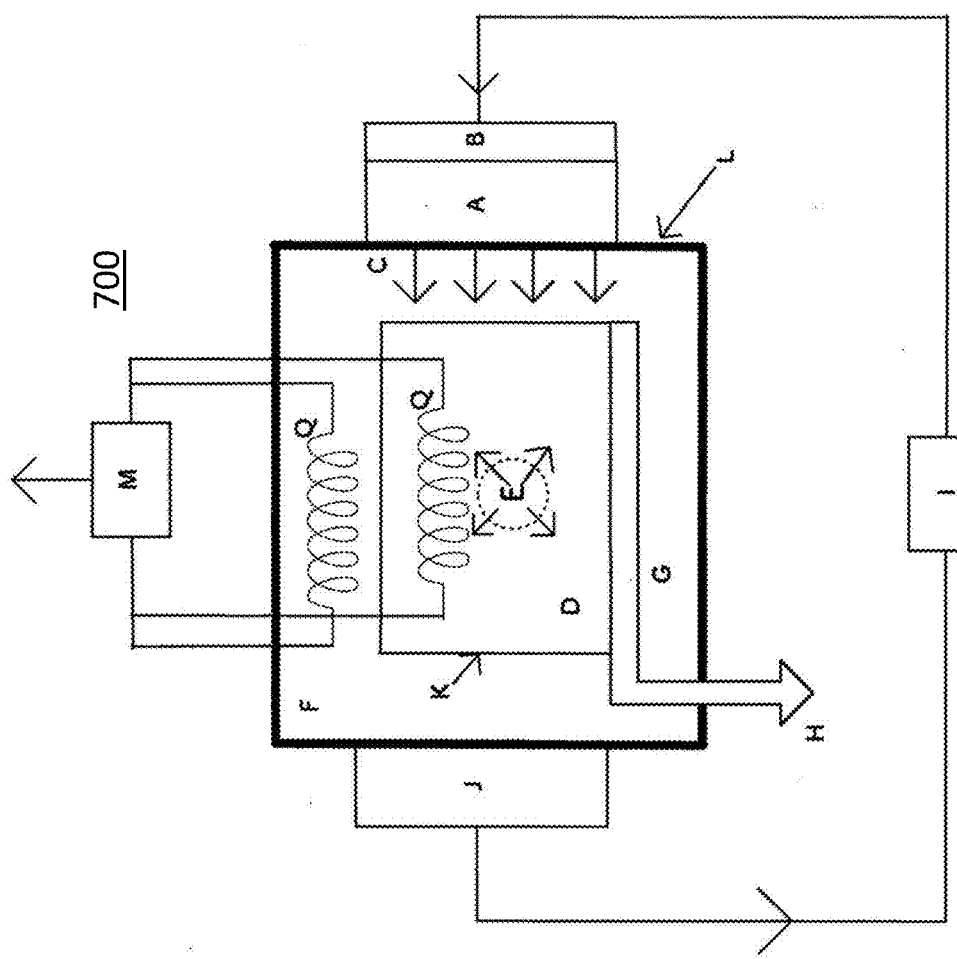
FIG. 7 illustrates a side view of a liquid phase based transmutation system with laser assisted separation and monitoring.

FIG. 7 shows a laser operation system 700 for the purposes of spectroscopy, active monitoring and fission product separation. Component A is the CAN laser (in bundles appropriately); component B is the modulator/controller of the CAN laser (controlling the laser properties such as the power level, amplitude shape, periods and phases, the relative operations, direction, etc.); component C is the laser rays irradiating the solution and solvents in the central tank (see component K) for both the monitoring and separation (or controlling the chemistry of the solvents); component D is the solution that contains solvents including the transuraniums (such as Am, Cm, Np) ions that are to be separated and transmuted by the transmutator E [Ref. 5] (emanating fusion produced high energy neutrons); component F is the water that stops the neutrons both from the fusion source, i.e., transmutator E, and from the fission products; component G is the precipitation that is to be taken out of the deposit at the bottom of the central tank (as an example of a separation by laser chemistry in the central tank where solution is contained); component H is the unnecessary deposited elements that are not to be transmuted at this time in this particular tank and to be transferred to another tank, where they will be again in the solution similar to this to be further separated and transmuted; component I is the feedback ANN circuit and computer that registers and controls the signal of the monitored information such as spectrum of the FP; component J is the detector of the transmitted CAN laser signals (amplitudes, phases and frequencies, and deflections, etc.); component K is the "thin" first wall of the central tank that allow nearly free transmission of the energetic neutrons generated either by fusion or fission in the central tank, and component L is the outer tank with a thick enough wall that contains overall materials and neutrons. Both the central tank K and the outer tank L are equipped with appropriate monitors of the temperature, pressure, and some additional physical and chemical information in addition to the CAN laser monitoring to monitor, and provide alerts regarding, the transmutator's condition to keep the tanks from going over the "board" (such as runaway events) with appropriate safeguards such as the real-timed valves, electrical switches, etc. Component Q is a heat exchanger and component M converts heat to electricity.

Once the operation begins, the heated solution and water in the central and outer tanks K and L may be maintained in its state by motors (or perhaps appropriate channels inside the tanks, or equivalents) as desired, and excess heat is taken out and converted into electrical (or chemical) energies by component M.

Figure 9:
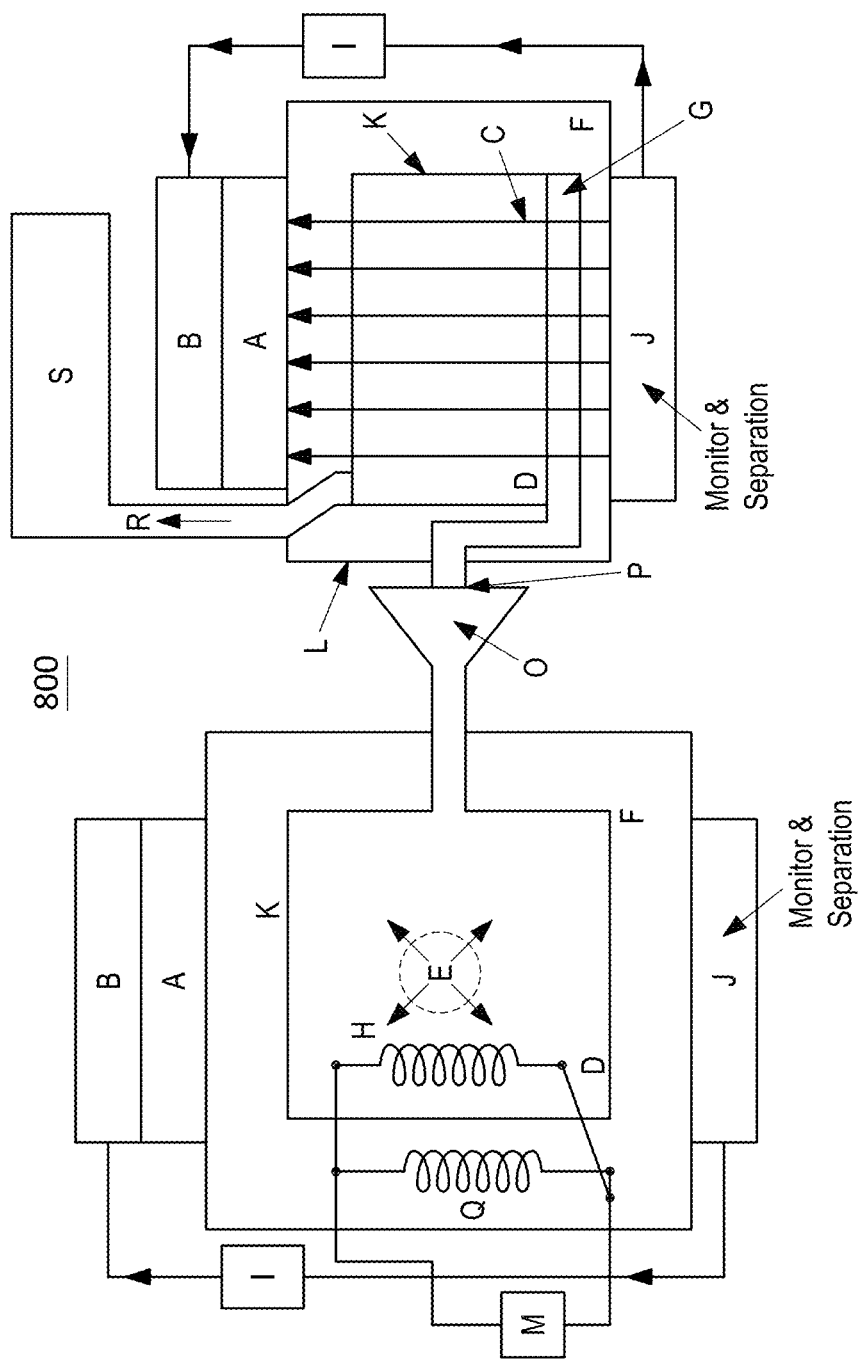
FIG. 9 illustrates a side view of an alternative embodiment of a two-step liquid phase based separation and transmutation system with laser assisted separation and monitoring.

Referring to FIG. 9, in a system 800, component P is the pipe (and its valve that controls the flow between the tanks) connecting the segregated separator tank and the transmutator tank. Component O is a solving region of the injected separated MA into the transmutator tank. The residual fission products left in component D are transported out through the pipe component R into a storage tank component S.

Figure 8:
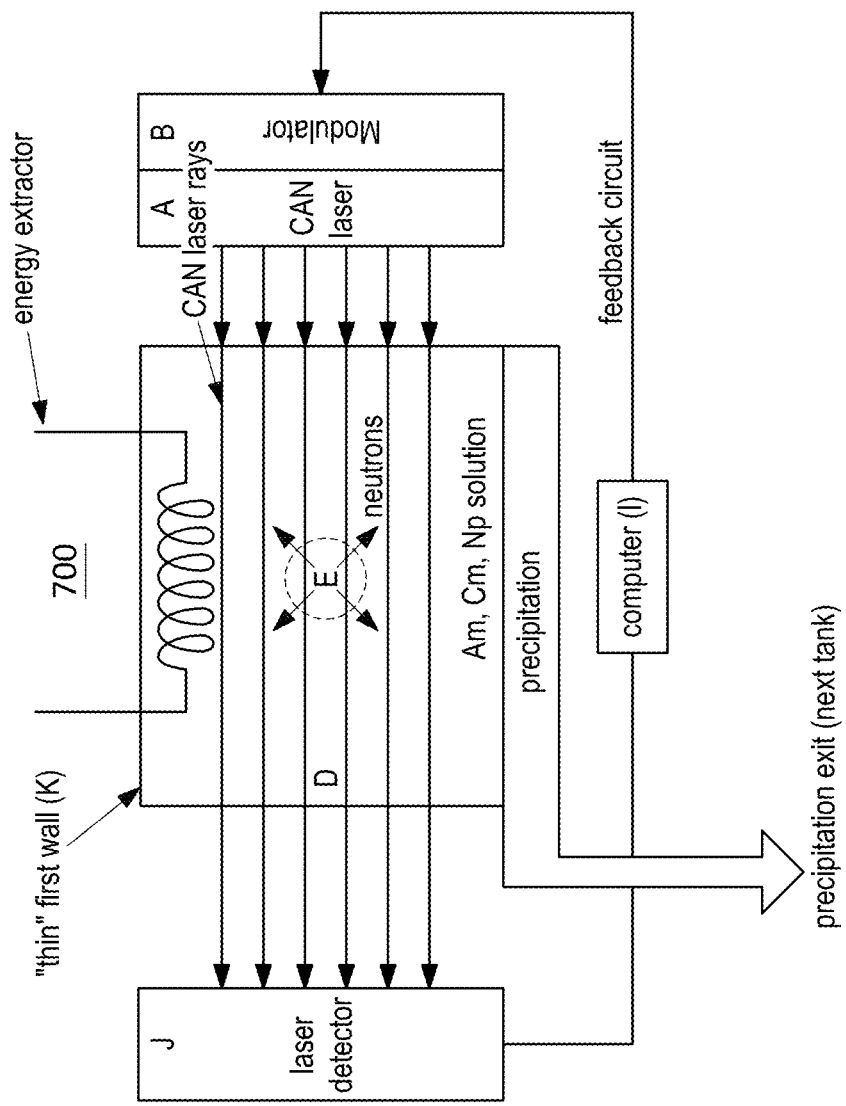
FIG. 8 illustrates a partial detail view of a central solution tank of the liquid phase based transmutation system with laser assisted separation and monitoring shown in FIG. 6.

Referring to FIG. 8, in a system 700, the central tank K contains the solution D of the transuraniums that were extracted from the original spent fuel that has been liquefied with proper solutions (such as acids). In this stage of the process, we assume that U and Pu have been already extracted from the solution D by known processes (such as PUREX). The solution D may thus include other elements such as fission products (FPs such as Cs, Sr, I, Zr, Tc, etc.). These elements can tend to absorb neutrons, but not necessarily proliferate neutrons as the transuraniums tend to do. Thus, the FPs need to be eliminated from the solution D in the central tank K by chemical reactions and laser chemistry, etc., with the help of the CAN laser A and other chemical means. If these elements precipitate by the added chemical and/or chemical excitation etc. from the CAN laser, the precipitated components of chemicals may be removed from this central tank K to another tank for the treatment of such elements as the fission products etc.

Upon completion of the separation process, the transuraniums (mainly Am, Cm, Np) are irradiated with neutrons from the transmutator E. These transuraniums may have different isotopes, but all of them are radioactive isotopes, as they are beyond uranium in their atomic number. Either neutrons from the transmutator E or neutrons arising from the fissions of the transuraniums will contribute to the transmutation of the transuraniums if neutrons are absorbed by these nuclei.

Turning to FIG. 9, the transmutator and laser monitor and separator system 800 includes two separate tanks segregating the separation and transmutation processes into two distinct tanks. For example, the separator (with laser monitor attached) is on the right, while the transmutator is on the left. The two systems are connected by a transmission pipe and valve, component P, which is used to transmit the deposited (or separated) transuraniums (MA) from the separator tank on the right into the transmutator tank on the left. The new carrier liquid (component O) preferably only contains (or primarily contains) TA, but not any more fission products that have been separated in the separator tank on the right. Separation is accomplished by either conventional chemical method or by laser (based on CAN laser), which operates to excite (for example) the MA atomic electrons for the purpose of chemical separation. The central tank D on the left has primarily (or only) MA solution. The elements left out of the liquid contain mainly FPs that are transported in a pipe (component R) into a storage tank (component S). Such FPs may be put together into solidified materials for burial treatment. [Refs. 22 and 23]

When fission occurs by the neutron capture by the transuraniums, a high-energy yield from the nuclear fission is typically expected (such as in the range of 200 MeV per fission). On the other hand, the fusion neutron energy does not exceed 15 MeV. Both the fusion neutrons as well as the fission events in the central tank yield heat in the tank. The solution mixes the heat in general by the convective flows (either by itself or, if necessary, by an externally driven motor). The extracted heat transporter and extractor, i.e. component M, remove the generated heat in the central tank and convert it into electric energy. These processes need to be monitored both physically (such as the temperature, pressure of the solution in the tank) and chemically (such as the chemical states of various molecules, atoms, and ions in the solution through the CAN laser monitoring) in real time for the monitoring and control purpose to feedback to the tank parameters by controlling valves and other knobs as well as the CAN operation.

A typical nuclear reactor generates the following spent fuel nuclear wastes. [Refs. 22 and 23] Per 1 ton of uranium which generates 50 GWd of power. During this operation the nuclear wastes are: about 2.5 kg of transuraniums (Np, Am, Cm) and about 50 kg of fission products. The amount of 2.5 kg of MA (Minor Actinides, i.e. transuraniums) is about 100 mol, approximately $6 \times 10^{25}$ atoms of MA. This amounts to about $7 \times 10^{20}$ atoms of MA per second, approximately $10^{21}$ MA atoms in 1 sec. This translates into about 1 kW of laser power if the absorption of one photon (eV) by each MA atom in order to laser excite each atom is required. Let $\eta$ be the efficiency of excitation of an MA atom by 1 photon of laser. Then the power P of the laser to be absorbed by all MA atoms of the above amount per second is $$P \sim (1/\eta) kW.$$

If $\eta \sim 0.01$, P is about 100 kW. This amount is not small. On the other hand, borrowing efficient and large fluence CAN laser technology [Ref. 12], it is within the realm of the technology reach. In typical chemical inducements, we envision that the laser may be either close to cw, or very long pulse so that the fiber laser efficiency and fluence are at its maximum. In order to satisfy the proper resonances or specific frequencies, the fiber laser frequencies need to be tuned (prior to the operation, most likely) to the specific values.

As further example embodiments, the high efficiency neutron generation method is applicable to fields and processes requiring neutrons having energy up to 14 MeV, such as, e.g., cancer medical applications such as, e.g., boron-neutron capture therapy (BNCT) and radioisotope generation, structural integrity testing of buildings, bridges, etc., material science and chip testing, oil well logging and the like.

Two additional embodiments are presented: (1) a first embodiment directed to a 2-tank strategy to reduce the overall neutron cost whereas Tank 1 is critical and Tank 2 subcritical, and (2) second embodiment directed toward a greener, carbon negative transmutator through the generation of synthetic fuel by the chemical conversion of $CO\_2$ whereas the heat to drive the reaction is generated by fission.

Figure 10:
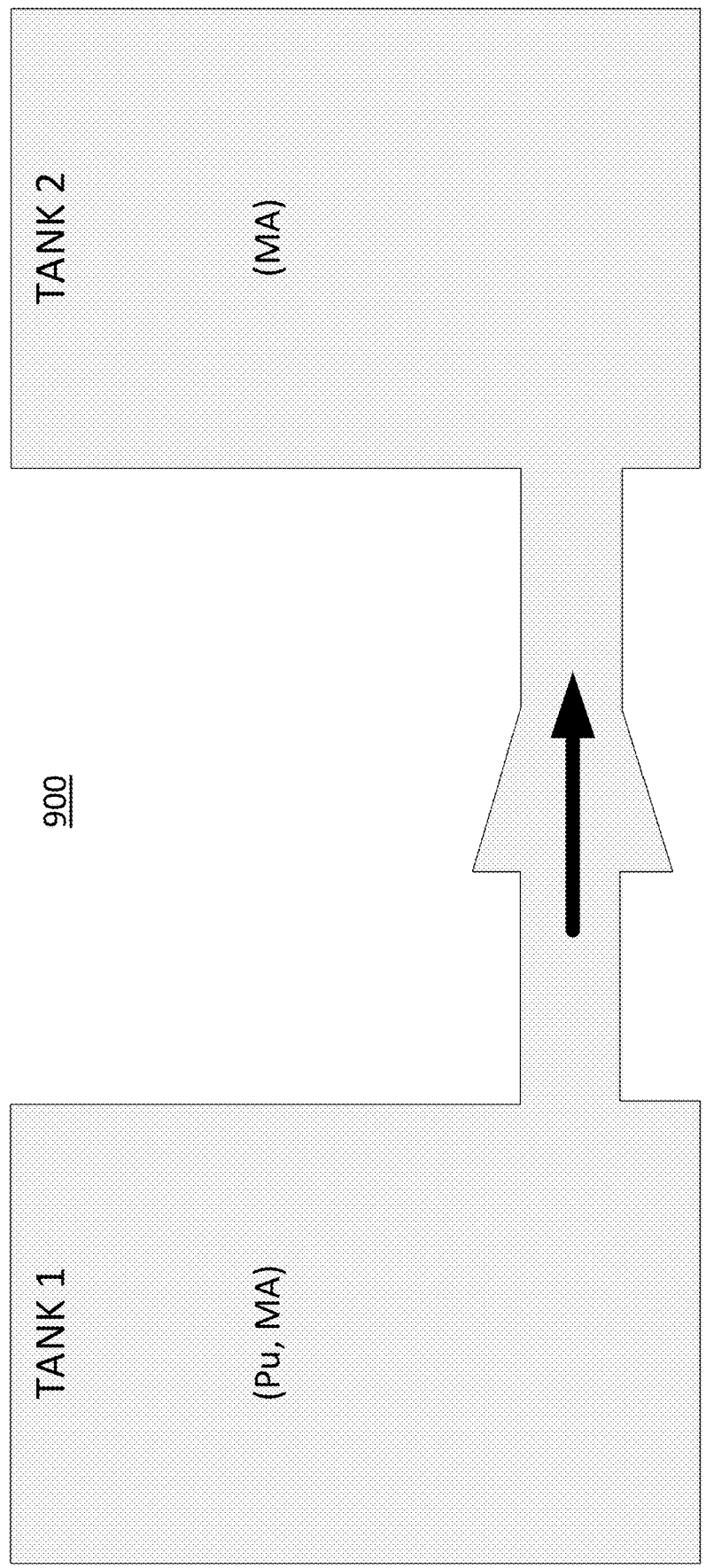
FIG. 10 illustrates an embodiment directed to a 2-tank strategy to reduce the overall neutron cost whereas Tank 1 is critical and Tank 2 subcritical.

In an example embodiment depicted in FIG. 10, the transmutator 900 comprises two interconnected sets of tanks referred to as Tank 1 and Tank 2. Tanks 1 and 2, which are substantially similar to the tanks depicted in FIGS. 2A and 3A, may include a tank containing materials to be transmuted and a neutron source tank positioned therein, and as depicted in FIGS. 1A and 1B, these tanks may be enclosed by additional concentric tanks. Tank 1 preferably contains a mixture of Pu and minor actinides (MA) including neptunium, americium and curium (Np, Am, Cm), while Tank 2 contains a mixture of only minor actinides (MA). Tank 1 is critical ($k_{eff}=1$), hence Tank 1 does not require external neutrons. Furthermore, Tank 1 is fueled using the spent nuclear fuel (Pu and MA) after chemical removal of fission products. Tank 1 utilizes fast neutrons (fusion neutrons in addition to unmoderated fission neutrons with energy >1 MeV) to transmute the minor actinides (MA) and plutonium (Pu), while the concentration of curium (Cm) is increased. Alternatively, a minor amount of neutrons can be injected into Tank 1 to kick start the incineration of Pu.

The minor actinides (MA) in Tank 1, now with higher concentration of curium (Cm), may be separated and fed into Tank 2. The connected Tank 2 operates in parallel to burn the minor actinides (MA) with the increased concentration of curium (Cm) in a subcritical ($k_{eff}<1$) operation, as described above. This process provides a path to safely and smoothly burn the entire transuranic spent nuclear fuel (not just MAs) while reducing the number of neutrons required to do so by about a factor of 100×.

In a further embodiment, Tank 1 and Tank 2 are real-time monitored by laser and gamma. A broadband or a scanning laser is used to monitor the elemental composition of Tank 1 and Tank 2 using the laser induced fluorescence and scattering. Gamma monitoring can be either active or passive. Passive gamma monitoring utilizes gamma generated from nuclear decay or transition. Active gamma monitoring utilizes external gamma beam with energy above few MeV and relies on the nuclear resonance fluorescence. Both active and passive monitoring provides information about the isotopic composition of the transmutator fuel. Information from the laser and the gamma monitoring is collected and fed into a computer comprising logic adapted to predict and/or control future states of the transmutator by adjusting the refueling of Tank 1 or adjusting the MA concentration in Tank 2. To enable the detailed laser and gamma monitoring the fuel in Tank 1 and Tank 2 is dissolved in a molten salt allowing for light propagation. Real time monitoring is an integral part of the overall active safety and efficiency of the transmutator whereas a detail knowledge of the transmutator composition will determine the position of the control rods, the refueling and fission product extraction. Passive features include molten salt that expands with increasing temperature thus shutting the transmutator down; dump tank separated from the transmutator by a freeze plug whereas any abnormal temperature spike will melt the plug and gravity flow the entire inventory of the transmutator into the dump tank composed of neutron absorbers.

In a further embodiment the walls of Tank 1 and Tank 2 are made of carbon based materials, e.g., diamond. To protect walls from chemical erosion and corrosion, the salt adjacent to the wall (facing the molten salt) is allowed to solidify preventing direct contact of the molten salt with the walls.

In a further embodiment, the transmutator embodiments described above can be applied to the methods and processes of carbon dioxide reduction such as its use as a coolant and its generation of a synthetic fuel to become overall carbon-negative is suggested. In the following example embodiment, the synthetic fuel ($CH_4$-methane) may be generated via $CO_2+4H_2 \rightarrow CH_4+2H_2O$ reaction (Sabatier reaction) requiring 200-400° C. and the presence of a catalyst, e.g., Ni, Cu, Ru. The $CO_2$ may be extracted from the atmosphere, the ocean, or by direct capturing of $CO_2$ at the source of emission such as automobiles, houses, chimneys and smokestacks. The molten salt transmutator operating temperature range is 250-1200° C. and, thus, is ideally situated to supply continuously the necessary temperature required to drive the Sabatier reaction to produce methane, and provide an effective pathway to stabilize and reduce the $CO_2$ concentration in the atmosphere and the ocean.

Figure 11:
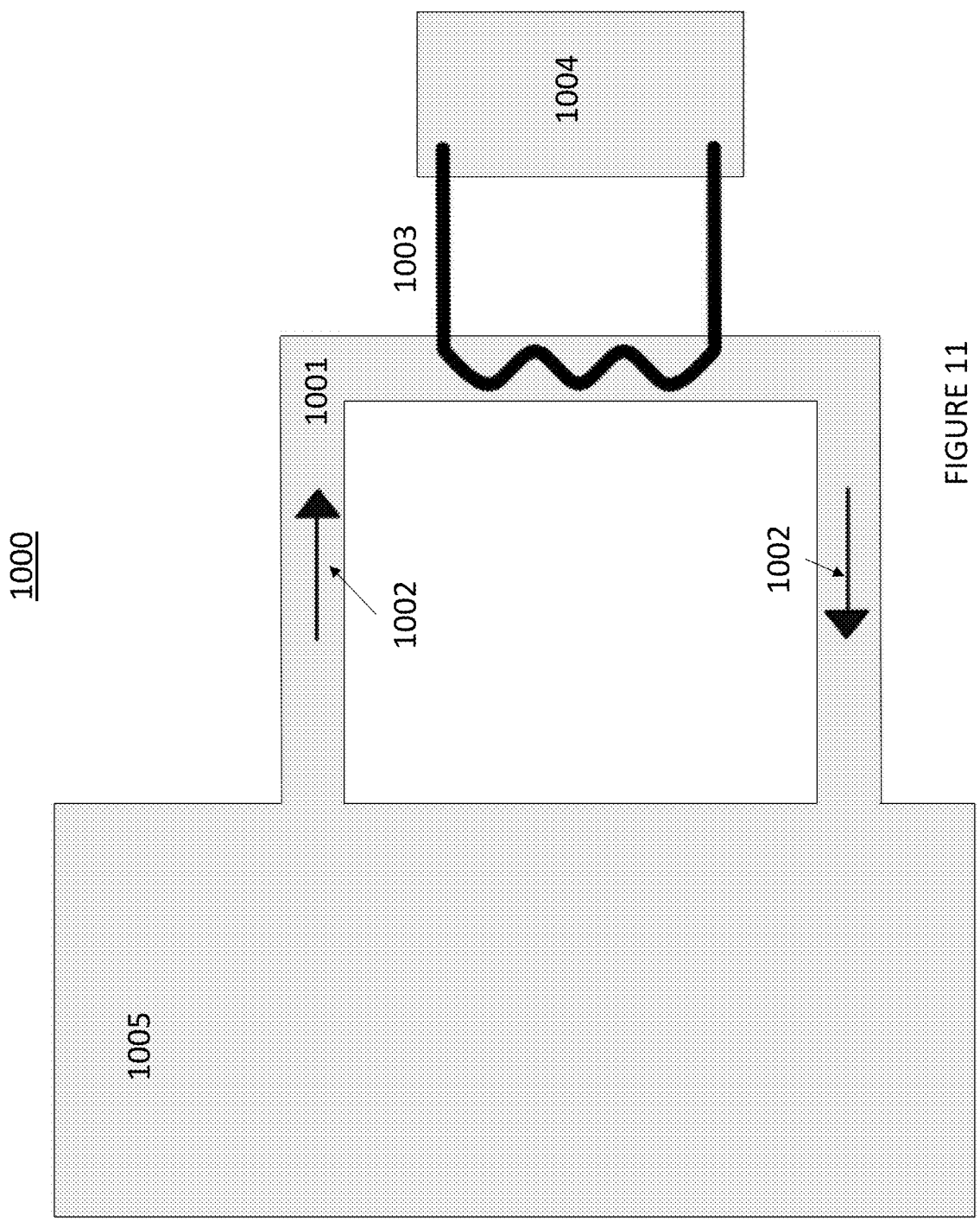
FIG. 11 illustrates an embodiment directed to a process of the generation of synthetic fuel by the chemical conversion of CO_2 whereas the heat to drive the reaction is generated by fission.
Figure 12:
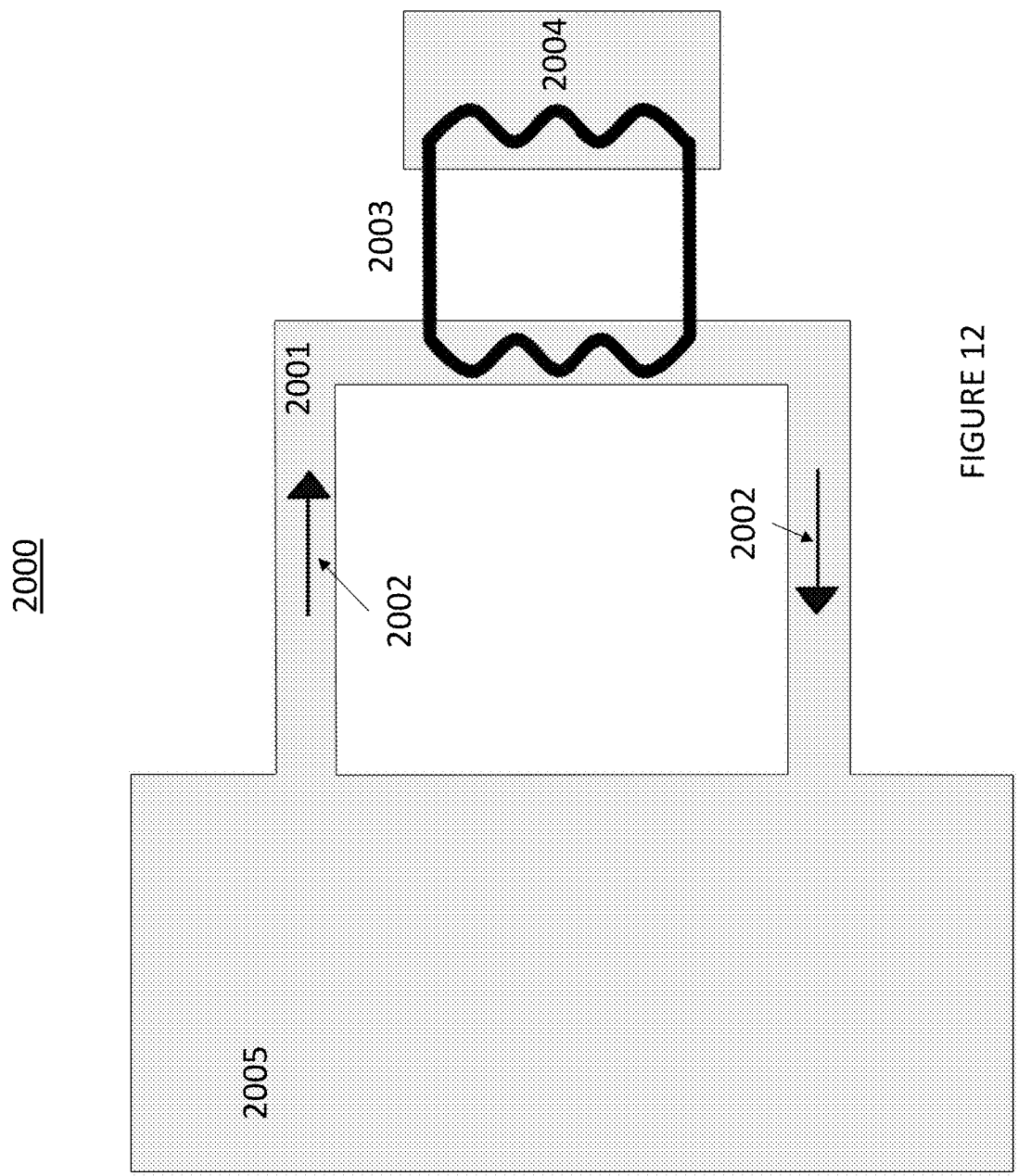
FIG. 12 illustrates another embodiment directed to a process of the generation of synthetic fuel by the chemical conversion of CO_2 whereas the heat to drive the reaction is generated by fission.

Referring to FIG. 12, a partial view of a synthetic fuel generation system 1000 is shown to include a transmutator vessel 1005, a secondary loop pipe 1001, the direction of the flow of the molten salt+TRU 1002, a heat exchanger 1003, and a tank for the Sabatier reaction 1004. In this example embodiment, the heat transfer fluid in the heat exchanger pipe is CO2 which is directly used in the tank 1004. In an alternative embodiment, shown in FIG. 11, the heat exchange pipe of the heat exchanger 2003 of a synthetic fuel generation system 2000 is a closed and independent system, and the transfer fluid may be replaced with a molten salt. The synthetic fuel generation system 2000 is shown to include a transmutator vessel 2005, a secondary loop pipe 2001, the direction of the flow of the molten salt+TRU 2002, a heat exchanger 2003, and a tank for the Sabatier reaction 2004.

Figure 13:
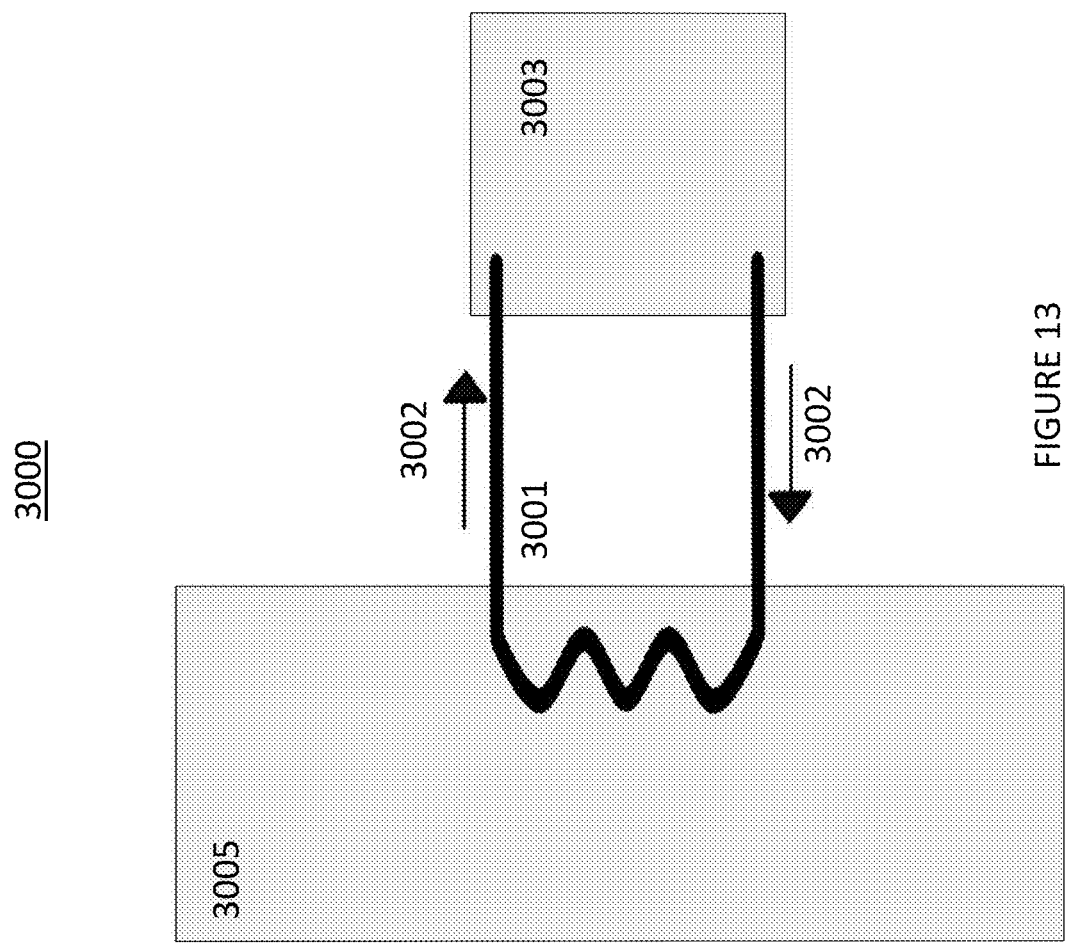
FIG. 13 illustrates another embodiment directed to a process of the generation of synthetic fuel by the chemical conversion of CO_2 whereas the heat to drive the reaction is generated by fission.
Figure 14:
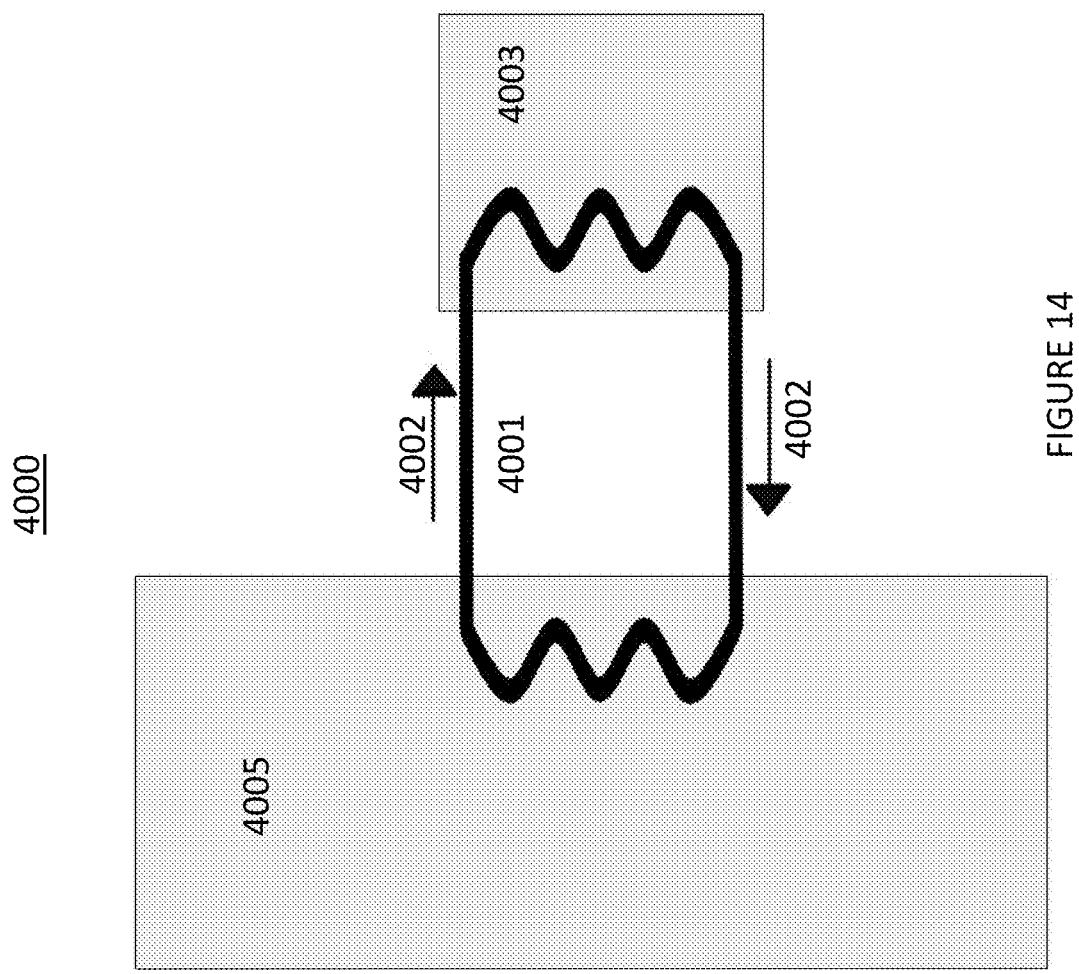
FIG. 14 illustrates another embodiment directed to a process of the generation of synthetic fuel by the chemical conversion of CO_2 whereas the heat to drive the reaction is generated by fission.

In a further alternative embodiment, FIG. 13 shows a partial view of a synthetic fuel generation system 3000 having a transmutator 3005, a heat exchanger 3001, the direction of the flow of the fluid 3002, and a tank for the Sabatier reaction 3003. In this example embodiment, the reactant, $CO_2$, from the Sabatier reaction is the transfer fluid. In an alternative embodiment, FIG. 14 shows the heat exchanger loop 4001 of a synthetic fuel generation system 4000 as closed and independent loop with the heat transfer fluid being, for example, a molten salt. The synthetic fuel generation system 4000 is shown to include a transmutator 4005, a heat exchanger 4001, the direction of the flow of the fluid 4002, and a tank for the Sabatier reaction 4003.

In an additional embodiment, ionizing radiation originating within the transmutator and carried by the molten salt is utilized as a 1-10 s eV energy source to enable various chemical reactions. The 1-10 eV energy source enables, for example, the production of ammonia and conversion of $CO\_2+CH\_4 \rightarrow CH\_3\ COOH$.

Processing circuitry for use with embodiments of the present disclosure can include one or more computers, processors, microprocessors, controllers, and/or microcontrollers, each of which can be a discrete chip or distributed amongst (and a portion of) a number of different chips. Processing circuitry for use with embodiments of the present disclosure can include a digital signal processor, which can be implemented in hardware and/or software of the processing circuitry for use with embodiments of the present disclosure. In some embodiments, a DSP is a discrete semiconductor chip. Processing circuitry for use with embodiments of the present disclosure can be communicatively coupled with the other components of the figures herein. Processing circuitry for use with embodiments of the present disclosure can execute software instructions stored on memory that cause the processing circuitry to take a host of different actions and control the other components in figures herein.

Processing circuitry for use with embodiments of the present disclosure can also perform other software and/or hardware routines. For example, processing circuitry for use with embodiments of the present disclosure can interface with communication circuitry and perform analog-to-digital conversions, encoding and decoding, other digital signal processing and other functions that facilitate the conversion of voice, video, and data signals into a format (e.g., in-phase and quadrature) suitable for provision to communication circuitry, and can cause communication circuitry to transmit the RF signals wirelessly over links.

Communication circuitry for use with embodiments of the present disclosure can be implemented as one or more chips and/or components (e.g., transmitter, receiver, transceiver, and/or other communication circuitry) that perform wireless communications over links under the appropriate protocol (e.g., Wi-Fi, Bluetooth, Bluetooth Low Energy, Near Field Communication (NFC), Radio Frequency Identification (RFID), proprietary protocols, and others. One or more other antennas can be included with communication circuitry as needed to operate with the various protocols and circuits. In some embodiments, communication circuitry for use with embodiments of the present disclosure can share an antenna for transmission over links. Processing circuitry for use with embodiments of the present disclosure can also interface with communication circuitry to perform the reverse functions necessary to receive a wireless transmission and convert it into digital data, voice, and video. RF communication circuitry can include a transmitter and a receiver (e.g., integrated as a transceiver) and associated encoder logic. A reader can also include communication circuitry and interfaces for wired communication (e.g., a USB port, etc.) as well as circuitry for determining the geographic position of reader device (e.g., global positioning system (GPS) hardware).

Processing circuitry for use with embodiments of the present disclosure can also be adapted to execute the operating system and any software applications that reside on a reader device, process video and graphics, and perform those other functions not related to the processing of communications transmitted and received. Any number of applications (also known as "user interface applications") can be executed by processing circuitry on a dedicated or mobile phone reader device at any one time, and may include one or more applications that are related to a diabetes monitoring regime, in addition to the other commonly used applications, e.g., smart phone apps that are unrelated to such a regime like email, calendar, weather, sports, games, etc.

Memory for use with embodiments of the present disclosure can be shared by one or more of the various functional units present within a reader device, or can be distributed amongst two or more of them (e.g., as separate memories present within different chips). Memory can also be a separate chip of its own. Memory can be non-transitory, and can be volatile (e.g., RAM, etc.) and/or non-volatile memory (e.g., ROM, flash memory, F-RAM, etc.).

Computer program instructions for carrying out operations in accordance with the described subject matter may be written in any combination of one or more programming languages, including an object oriented programming language such as Java, JavaScript, Smalltalk, C++, C #, Transact-SQL, XML, PHP or the like and conventional procedural programming languages, such as the "C" programming language or similar programming languages. The program instructions may execute entirely on the user's computing device (e.g., reader) or partly on the user's computing device. The program instructions may reside partly on the user's computing device and partly on a remote computing device or entirely on the remote computing device or server, e.g., for instances where the identified frequency is uploaded to the remote location for processing. In the latter scenario, the remote computing device may be connected to the user's computing device through any type of network, or the connection may be made to an external computer.

Various aspects of the present subject matter are set forth below, in review of, and/or in supplementation to, the embodiments described thus far, with the emphasis here being on the interrelation and interchangeability of the following embodiments. In other words, an emphasis is on the fact that each feature of the embodiments can be combined with each and every other feature unless explicitly stated otherwise or logically implausible.

According to embodiments, a transmutator system for transmutation of long-lived radioactive transuranic waste comprises a neutron source tank including a neutron source therein, where the neutron source comprising a plurality of concentric tanks positioned about the neutron source tank and comprising a one or more mixtures of long-lived radioactive transuranic waste dissolved in FLiBe salt, an electrostatic accelerator oriented to axially propagate a deuteron beam into the neutron source.

In embodiments, the transmutator further comprises a magnet to focus the deuteron beam from the accelerator through an entrance port of the neutron source.

In embodiments, the neutron source comprises a target gas.

In embodiments, the target gas comprises one of deuterium or tritium.

In embodiments, the neutron source comprises a solid target.

In embodiments, the solid target comprises solid one of titanium-tritium, titanium-deuterium, titanium or titanium lattice.

In embodiments, the electrostatic accelerator includes a plurality of electrostatic accelerators positioned with the neutron source and wherein the solid target comprises a plurality of solid targets.

In embodiments, the electrostatic accelerator includes a plurality of electrostatic accelerators positioned outside the neutron source.

In embodiments, the electrostatic accelerator includes a plurality of electrostatic accelerators positioned outside the neutron source and wherein the solid target comprises a plurality of solid targets.

In embodiments, the plurality of concentric tanks are segmented.

In embodiments, the plurality of concentric tanks are segmented axially.

In embodiments, the plurality of concentric tanks are segmented azimuthally.

In embodiments, the plurality of segmented tanks comprise a first concentric tank positioned about the neutron source and comprising a first mixture of long-lived radioactive transuranic waste dissolved in FLiBe salt, a second concentric tank positioned about the first concentric tank and comprising a second mixture of long-lived radioactive transuranic waste dissolved in FLiBe salt, a third concentric tank positioned about the second concentric tank and comprising a third mixture of long-lived radioactive transuranic waste dissolved in FLiBe salt, and a fourth concentric tank positioned about the third concentric tank and comprising one of water or water and a neutron reflecting boundary.

In embodiments, the segmented first, second, third and fourth concentric tanks are segmented axially.

In embodiments, the segmented first, second, third and fourth concentric tanks are segmented azimuthally.

In embodiments, the plurality of concentric tanks form a first set of tanks, wherein the transmutator system further comprising a second set of tanks containing a mixture of Pu and minor actinides (MA) including neptunium, americium and curium (Np, Am, Cm).

In embodiments, the second set of tanks are configured to operate at critical.

In embodiments, the walls of one of the first set of tanks or the second set of tanks are made of carbon based materials.

In embodiments, the carbon based materials are diamond.

It should be noted that all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the following description does not explicitly state, in a particular instance, that such combinations or substitutions are possible. It is explicitly acknowledged that express recitation of every possible combination and substitution is overly burdensome, especially given that the permissibility of each and every such combination and substitution will be readily recognized by those of ordinary skill in the art.

To the extent the embodiments disclosed herein include or operate in association with memory, storage, and/or computer readable media, then that memory, storage, and/or computer readable media are non-transitory. Accordingly, to the extent that memory, storage, and/or computer readable media are covered by one or more claims, then that memory, storage, and/or computer readable media is only non-transitory.

As used herein and in the appended claims, the singular forms "a," "an," and "the" include plural referents unless the context clearly dictates otherwise.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the inventive scope of the claims by features, functions, steps, or elements that are not within that scope.

REFERENCES

[Ref. 1] https://www.gao.gov/key_issues/disposal_of_highlevel_nuclear_waste/issue_summary Accessed Oct. 23, 2018.

[Ref. 2] Gulik, V., & Tkaczyk, A. H., Cost optimization of ADS design: Comparative study of externally driven heterogeneous and homogeneous two-zone subcritical reactor systems. *Nuclear Engineering and Design*, 270, 133-142 (2014).

[Ref. 3] Weston M. Stacey, Solving the Spent Nuclear Fuel Problem by Fissioning Transuranics in Subcritical Advanced Burner Reactors Driven by Tokamak Fusion Neutron Sources, *Nuclear Technology*, (2017). DOI: 10.1080/00295450.2017.1345585

[Ref. 4] Sheu, R. J., et al. "Depletion analysis on long-term operation of the conceptual Molten Salt Actinide Recycler & Transmuter (MOSART) by using a special sequence based on SCALE6/TRITON." *Annals of Nuclear Energy* 53 (2013): 1-8.

[Ref. 5] Tajima T. and Necas A., "Systems And Methods For FRC Based Transmutator And Radioisotope Generator," U.S. Patent Application No. 62/544,666, Aug. 11, 2017.

[Ref. 6] Tajima, Toshiki, Dietrich Habs, and Xueqing Yan. "Laser acceleration of ions for radiation therapy." Reviews of Accelerator Science and Technology 2.01 (2009): 201-228.

[Ref. 7] Kishimoto, Y., and Tajima, T., *Strong Coupling between Clusters and Radiation*, High Field Science, eds. T. Tajima, K. Mima, and H. Baldis (Kluwer, N Y, 2000). pp 83-96.

[Ref. 8] Kishimoto, Y., Masaki, T., and Tajima, T., *High energy ions and nuclear fusion in laser-cluster interaction*, Phys. of Plasmas 9, 589-601(2002).

[Ref. 9] Yan, X. Q., Tajima, T., Hegelich, B. M., Yin, L., and Habs, D., *Theory of laser ion acceleration from a foil target of nanometer thickness*, Applied Phys. B 98, 711 (2010).

[Ref. 10] Mako, F., and T. Tajima. "Collective ion acceleration by a reflexing electron beam: Model and scaling." *The Physics of fluids* 27, no. 7: 1815-1820 (1984).

[Ref. 11] Steinke, S., Henig, A., Schnürer, M., Sokollik, T., Nickles, P. V., Jung, D., Kiefer, D., Horlein, R., Schreiber, J., Tajima, T. and Yan, X. Q., Efficient ion acceleration by collective laser-driven electron dynamics with ultra-thin foil targets. *Laser and Particle Beams*, 28(1), pp. 215-221 (2010).

[Ref. 12] Mourou, G., Brocklesby, B., Tajima, T. and Limpert, J., The future is fibre accelerators. *Nature Photonics*, 7(4), p. 258 (2013).

[Ref. 13] Mourou, G., S. Mirnov, E. Khazanov, and A. Sergeev. "Single cycle thin film compressor opening the door to Zeptosecond-Exawatt physics." *The European Physical Journal Special Topics* 223, no. 6: 1181-1188 (2014).

[Ref. 14] Zhou, M. L., Yan, X. Q., Mourou, G., Wheeler, J. A., Bin, J. H., Schreiber, J. and Tajima, T., 2016. Proton acceleration by single-cycle laser pulses offers a novel monoenergetic and stable operating regime. *Physics of Plasmas*, 23(4), p. 043112 (2016).

[Ref. 15] Tajima, T., "Laser driven compact ion accelerator," U.S. Pat. No. 6,867,419, issued Mar. 15, 2005.

[Ref. 16] Esirkepov, T., M. Yamagiwa, and T. Tajima. "Laser ion-acceleration scaling laws seen in multiparametric particle-in-cell simulations." *Physical review letters* 96, no. 10 (2006): 105001.

[Ref. 17] Tajima T., Mourou G. and Necas A., "Systems And Methods For Liquid Phase Based Transmutation With Can Laser Based Monitoring," U.S. Patent Application No. 62/665,287, May 1, 2018.

[Ref. 18] D. Strickland and G. Mourou, "Compression of Amplified Chirped Optical Pulses," Opt. Commun. 56, 219-221 (December 1985).

[Ref. 19] G. Mourou and J. Nees "Selectively Triggered High-Contrast Laser", U.S. Pat. No. 5,541,947, issued Jul. 30, 1996.

[Ref. 20] A. Dubietis, G. Jonušauskas, and A. Piskarskas, "Powerful femtosecond pulse generation by chirped and stretched pulse parametric amplification in BBO crystal," Opt. Commun. 88(4-6), 437-440 (1992).

[Ref. 21] R. Budrinuas, T. Stanislauskas, J. Adamonis, A. Alecknavicius, G. Veitas, G. Stanislovas-Balickas, A. Michailova, and A. Varanaci-Iusi, 53 W average power CEP-stabilized OPCPA, system delivering 5.5 TW few cycle pulses at 1 kHz repetition rate, Vol. 25, No. 5|6 Mar. 2017|OPTICS EXPRESS 5797

[Ref. 22] S. Backus, C. Durfee, G. Mourou, H. C. Kapteyn, M. M. Murnane, 0.2 Terawatt laser system at 1 kHz, Opt. Lett. 22, 1256 (1997).

[Ref. 23] A. Giesen and J. Speiser, "Fifteen years of work on thin-disk lasers: results and scaling laws", IEEE J. Sel. Top. Quantum Electron. 13 (3), 598 (2007).

What is claimed:

1. A transmutator system for transmutation of radioactive transuranic waste comprising:
    a neutron source tank including a neutron source therein,
    a plurality of concentric tanks surrounding the neutron source tank and comprising one or more mixtures of radioactive transuranic waste dissolved in FLiBe salt,
    an electrostatic accelerator oriented and configured to axially propagate a deuteron beam into the neutron source tank to interact with the neutron source to generate fusion neutrons within the neutron source tank, wherein the fusion neutrons are emitted from the neutron source tank into the plurality of concentric cylindrical tanks to interact with the radioactive transuranic waste of the one or more mixtures of radioactive transuranic waste dissolved in FLiBe salt, and
    a monitoring system coupled to the plurality of concentric tanks and configured to monitor the chemistry of the one or more mixtures of radioactive transuranic waste dissolved in FLiBe salt contained in the plurality of concentric tanks.

2. The transmutator system of claim 1, further comprising a magnet to focus the deuteron beam from the accelerator through an entrance port of the neutron source tank.

3. The transmutator system of claim 1, wherein the neutron source comprises a target gas.

4. The transmutator system of claim 3, wherein the target gas comprises one of deuterium or tritium.

5. The transmutator system of claim 1, wherein the neutron source comprises a solid target, wherein the deuteron beam interacts with the solid target to generate fusion neutrons.

6. The transmutator system of claim 5, wherein the solid target comprises solid one of titanium-tritium, titanium-deuterium, titanium or titanium lattice.

7. The transmutator system of claim 5, wherein the electrostatic accelerator includes a plurality of electrostatic accelerators positioned within the neutron source tank and wherein the solid target comprises a plurality of solid targets.

8. The transmutator system of claim 1, wherein the electrostatic accelerator includes a plurality of electrostatic accelerators positioned outside the neutron source tank.

9. The transmutator system of claim 5, wherein the electrostatic accelerator includes a plurality of electrostatic accelerators positioned outside the neutron source tank and wherein the solid target comprises a plurality of solid targets.

10. The transmutator system of claim 1, wherein the electrostatic accelerator includes beam focusing magnets.

11. The transmutator system of claim 1, wherein the plurality of concentric tanks are segmented.

12. The transmutator system of claim 10, wherein the plurality of concentric tanks are one of segmented axially or segment azimuthally.

13. The transmutator system of claim 1, wherein the plurality of concentric tanks comprises:
    a first concentric tank surrounding the neutron source and comprising a first mixture of radioactive transuranic waste dissolved in FLiBe salt;
    a second concentric tank surrounding the first concentric tank and comprising a second mixture of radioactive transuranic waste dissolved in FLiBe salt;
    a third concentric tank surrounding the second concentric tank and comprising a third mixture of radioactive transuranic waste dissolved in FLiBe salt; and
    a fourth concentric tank surrounding the third concentric tank and comprising one of water or water and a neutron reflecting boundary.

14. The transmutator system of claim 13, wherein the first, second, third and fourth concentric tanks are segmented axially.

15. The transmutator system of claim 13, wherein the first, second, third and fourth concentric tanks are segmented azimuthally.

16. The transmutator system of claim 1, wherein the plurality of concentric tanks form a first set of tanks, wherein the transmutator system further comprising a second set of tanks containing a mixture of Pu and minor actinides (MA) including *neptunium*, americium and curium (Np, Am, Cm).

17. The transmutator system of claim 16, wherein the second set of tanks are configured to operate at critical.

18. The transmutator system of claim 16, wherein the walls of one of the first set of tanks or the second set of tanks are made of carbon based materials.

19. The transmutator system of claim 18, wherein the carbon based materials are diamond.

* * * * *